(12) United States Patent
Verdiyan

(10) Patent No.: US 12,626,303 B2
(45) Date of Patent: May 12, 2026

(54) THEMATIC PROTOCOL AND CIRCLE DATASTRUCTURE APPARATUSES, PROCESSES AND SYSTEMS

(71) Applicant: FMR LLC, Boston, MA (US)

(72) Inventor: Vardan Verdiyan, Watertown, MA (US)

(73) Assignee: FMR LLC, Boston, MA (US)

(*) Notice: Subject to any disclaimer, the term of this patent is extended or adjusted under 35 U.S.C. 154(b) by 126 days.

(21) Appl. No.: 17/558,529

(22) Filed: Dec. 21, 2021

(65) Prior Publication Data

US 2022/0198566 A1 Jun. 23, 2022

Related U.S. Application Data

(60) Provisional application No. 63/130,341, filed on Dec. 23, 2020.

(51) Int. Cl.
*G06Q 40/06* (2012.01)
*G06F 16/22* (2019.01)
(Continued)

(52) U.S. Cl.
CPC ......... *G06Q 40/06* (2013.01); *G06F 16/2291* (2019.01); *G06F 16/2343* (2019.01); *G06F 16/27* (2019.01); *G06Q 40/066* (2025.08)

(58) Field of Classification Search
USPC .......................................................... 705/36
See application file for complete search history.

(56) References Cited

U.S. PATENT DOCUMENTS 8,326,728 B1 * 12/2012 Devaney ................ G06Q 40/06
                                                                705/36 R
8,566,191 B2 * 10/2013 Shelon ................... G06Q 40/00
                                                                705/37
(Continued)

FOREIGN PATENT DOCUMENTS

WO WO-2008121295 A1 * 10/2008 ............. G06Q 40/06

OTHER PUBLICATIONS

Title: Know your client's behaviors: a cluster analysis of financial transactions Authors: John J. Thompson et al. Date: May 14, 2020 (Year: 2020).*

*Primary Examiner* — Bennett M Sigmond
*Assistant Examiner* — Yongsik Park
(74) *Attorney, Agent, or Firm* — Hanchuk Kheit LLP.; Walter G. Hanchuk

(57) ABSTRACT

The Thematic Protocol and Circle Datastructure Apparatuses, Processes and Systems ("TPCD") transforms TOP-RC search request, TOP-RC selection request inputs via TPCD components into TOP-RC search response, TOP-RC selection response, pool distribution notification request outputs. A thematic circle join request datastructure that includes a user object identifier, a portfolio object identifier associated with the user object identifier, and a thematic circle template identifier is obtained. A thematic circle object instantiated based on a thematic circle template corresponding to the thematic circle template identifier is determined. The user object identifier is added to participants datastructure. A portfolio object corresponding to the portfolio object identifier is marked as locked. A set of creation criteria associated with the thematic circle object is evaluated. The thematic circle object is activated based on a determination that the set of creation criteria has been met. A pool (Continued)

distribution protocol associated with the thematic circle object is initiated.

18 Claims, 12 Drawing Sheets

(51) Int. Cl.
*G06F 16/23* (2019.01)
*G06F 16/27* (2019.01)

(56) References Cited

U.S. PATENT DOCUMENTS

| | | | | |
|---|---|---|---|---|
| 9,818,156 B2 * | 11/2017 | Quinton | ................. | G06Q 40/06 |
| 10,963,963 B2 * | 3/2021 | Lynch | ................... | G06Q 40/06 |
| 2014/0304193 A1 * | 10/2014 | Iskoz | ................... | G06Q 40/06 |
| | | | | 705/36 R |
| 2015/0161733 A1 * | 6/2015 | Emsbo-Mattingly | ........................ | |
| | | | | G06Q 40/06 |
| | | | | 705/36 R |
| 2015/0178846 A1 * | 6/2015 | Feinschreiber | ........ | G06Q 40/06 |
| | | | | 705/36 R |
| 2015/0206245 A1 * | 7/2015 | Basu | ................... | G06F 3/0484 |
| | | | | 715/833 |
| 2016/0155200 A1 * | 6/2016 | Basu | ...................... | G06Q 40/06 |
| | | | | 705/36 R |
| 2016/0300307 A1 * | 10/2016 | Stearns | ................. | G06Q 40/06 |
| 2017/0048209 A1 * | 2/2017 | Lohe | ................. | G06Q 20/3829 |
| 2017/0200228 A1 * | 7/2017 | Bryant | .................. | G06Q 40/04 |

* cited by examiner

Retirement Circle Share Multiplier

| | | | |
|---|---|---|---|
| Age: 50 | 0.6% | Age: 80 | 5.7% |
| Age: 60 | 1.1% | Age: 90 | 16.5% |
| Age: 70 | 2.0% | Age: 100 | 34.0% |

720

TPCD IMPLEMENTATION CASE

710

TPCD IMPLEMENTATION CASE

THEMATIC PROTOCOL AND CIRCLE DATASTRUCTURE APPARATUSES, PROCESSES AND SYSTEMS

PRIORITY CLAIM

Applicant hereby claims benefit to priority under 35 USC § 119 as a non-provisional conversion of: U.S. provisional patent application Ser. No. 63/130,341, filed Dec. 23, 2020, entitled "Thematic Protocol and Circle Datastructure Apparatuses, Processes and Systems".

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address information technology, and more particularly, include Thematic Protocol and Circle Datastructure Apparatuses, Processes and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Information technology allows users to access streams of information through various user interfaces. Databases can track assets such as physical inventory, equity shares, accounts receivable/payable, debts/loans and derivatives thereof. Some assets have stable values while others vary greatly, the various assets sometimes generating income streams, while other times appreciate/depreciate. These different assets have different risk exposures and may be attractive to different types of owners. People own all types of assets, some of which are secured instruments to underlying assets. People have used exchanges to facilitate trading and selling of such assets. Computer information systems, such as NAICO-NET, Trade*Plus and E*Trade allowed owners to trade securities assets electronically.

BRIEF DESCRIPTION OF THE DRAWINGS

Appendices and/or drawings illustrating various, non-limiting, example, innovative aspects of the Thematic Protocol and Circle Datastructure Apparatuses, Processes and Systems (hereinafter "TPCD") disclosure, include.

Figure 1A:
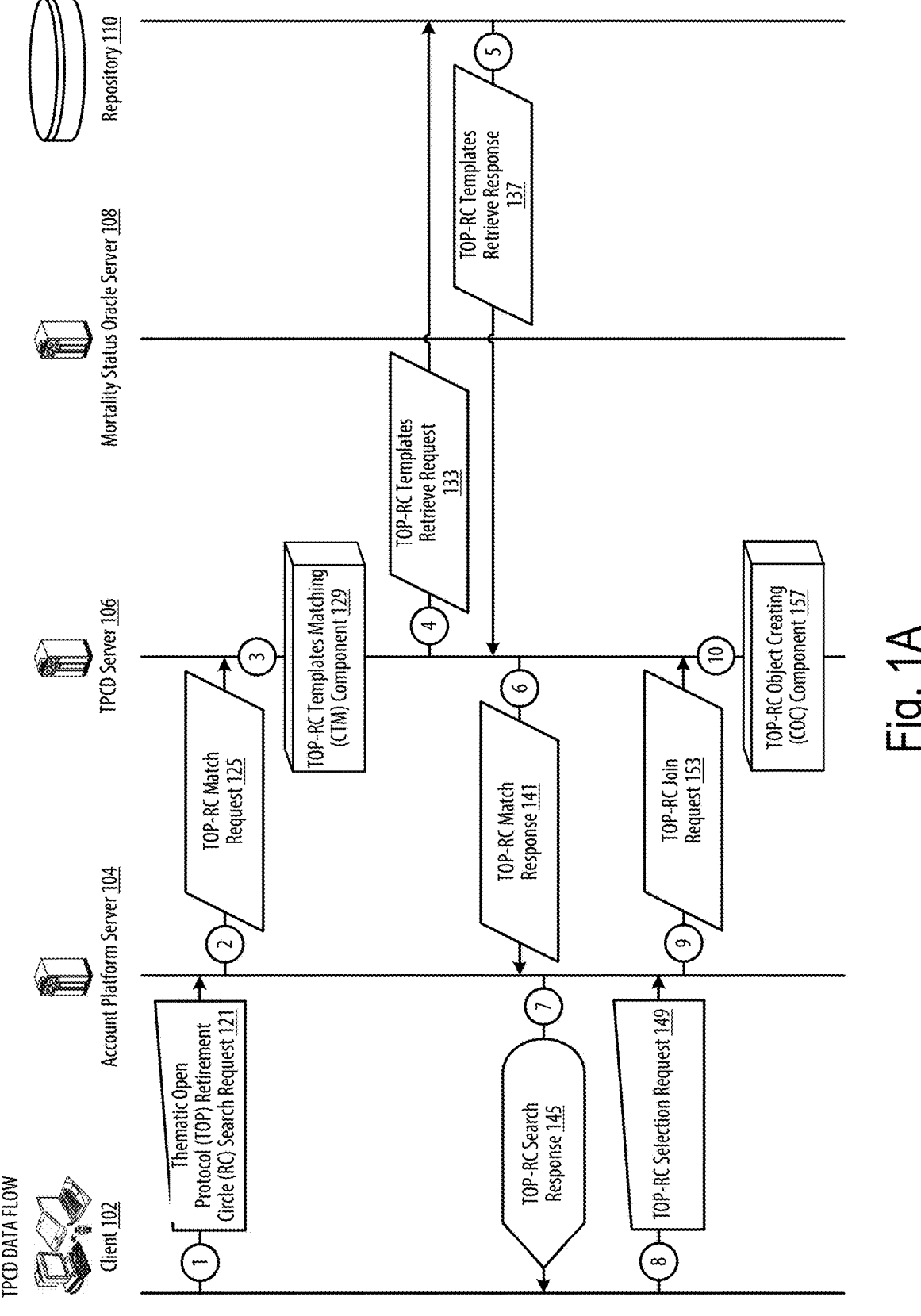
FIGS. 1A-B show non-limiting, example embodiments of a datagraph illustrating data flow(s) for the TPCD.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Thematic Protocol and Circle Datastructure Apparatuses, Processes and Systems (hereinafter "TPCD") transforms TOP-RC search request, TOP-RC selection request inputs, via TPCD components (e.g., CTM, COC, CPD, etc. components), into TOP-RC search response, TOP-RC selection response, pool distribution notification request outputs. The TPCD components, in various embodiments, implement advantageous features as set forth below.

Introduction

The TPCD provides unconventional features (e.g., including instructions to obtain an individual account owner identifier data structure, the individual account owner identifier data structure including an owner identifier, assets identifiers owned by the owner identifier, an owner category identifier, asset category identifier; obtain a thematic category input data structure and to determine an intersection of other account owner identifiers with the individual account owner identifier data structure by selecting the other account owner identifiers based on owner category identifiers, asset category identifiers and the thematic category input data structure; generate a thematic circle data structure from the intersection of other account owner identifiers with the individual account owner identifier data structures; pool asset identifiers into the thematic circle data structure from the asset identifiers owner by the owner identifiers from the determined intersection of other account owners identifiers with the individual account owner identifier data structure; update the thematic circle data structure employing circle distribution protocol when pooled asset identifiers incur any of removal from the thematic circle data structure, devaluation of value) that were never before available in information technology.

The implemented design solves a number of problems by allowing investors to harvest pooling premia (version of mortality credits) on top of their portfolio returns in a purposeful, flexible, stable and transparent way. Unlike designs like annuities, which require liquidating investor's portfolio and locking them forever, the Retirement Circle design allows lock-ups for periods as short as 1 year. Hence, the TOP-RC design allows harvesting a source of non-negative "structural alpha" (pooling premia) on top of various investment portfolios.

Creation of TOP-RC products could include many advances with regard to computer systems around the retirement income, target date, mutual fund and ESG spaces. One reason is that the possibility of a membership in a Retirement Circle enables investors get extra non-negative return/ yield on top of their pre-existing portfolios. So, any fund system may be incorporated and could offer an extra non-negative "structural alpha" in addition to its fund returns (if a participant locks a portion of their portfolio in a Retirement Circle for a limited period of time). Because of that, the TOP-RC is a game-changer in the competitive mutual fund environment and could attract new inflows and contracts.

The included approach is also disruptive in the annuity insurance business and bring even more AUM to the company from participants who would prefer Retirement Circles over annuities (where they have to give up their current portfolios and lock their assets forever). Retirement Circles could help retirees to get extra yield to support their living standards. So, the efficiency of the TOP-RC designs in harvesting the pooling premia could contribute to the overall well-being of the society. The thematic nature of the TOP-RC design would help traditionally "actuarially-disadvantaged" groups and minorities improve the income inequality. That is a type of a topic that should be a top priority in exceptional ethical standards organizations. The discussed design is a first mover in that space with the introduction of a new thematic product built on the TOP-RC design. All that would contribute to long term goals of Pushing the Investment Frontier in the Solutions Space.

One of the ideas behind this work is to try to forget the existing designs and create "from scratch" a design which would address the existing issues of designs like tontines/ annuities and meet modern customer needs. Hence, the nothing like this exists in the field. This paper https:// papers.ssrn.com/sol3/papers.cfm?abstract_id=3217551 is very different both philosophically and from the construction and feature standpoint, and does not have the advantages discussed in this disclosure.

Pooling premia/mortality credits were harvested in a very limited fashion to create products like annuities and tontines. The proposed design also uses the pooling premia as the building block, but enables limited lock-ups, diversity of ages, flexible portfolios and thematic pooling in a new transparent design. So, this design is in a sense a re-imagination of how to harvest the pooling premia and is structurally different from the other designs such as annuities or tontines. To achieve full transparency, an Open-Protocol framework may be created for TOP-RCs in an autonomous fashion and whose code would be available to the public. The performed analytical R&D enabled us to understand how to make the TOP-RC type of designs work to produce a reasonably stable pooling premia.

Additional details regarding TOP-RC design may be found below.

Thematic Open-Protocol (TOP) Retirement Circle (RC) is a novel design, which with the help of TOP-RC Platform allows creation and distribution of TOP-RCs. The design of the TOP-RC resulted from extensive analytical R&D, to understand how to make stable, attractive, flexible and transparent structure to harvest the pooling premia.

In one embodiment, a TOP Retirement Circle is an agreement between circle members, which includes:

TOP-RC Electronic Contract

Circle Construction Protocol

Pool Distribution Protocol

Circle Construction Protocol (CCP) includes a set of rules which determines if the membership in the TOP-RC is accepted and if the given TOP-RC is created. That protocol may be open-source, transparent and available to the applicant of the Retirement Circle before the application. After the Retirement Circle application is completed, the portion of the member's portfolio which was used to apply for the RC may be locked. Then, based on the CCP, the retirement circle either gets created or not. If the Circle is created, then the participant's access to the portfolio remains locked for the pre-specified period of time. When that time passes, then the second protocol is in effect.

Pool Distribution Protocol (PDP) determines the length and the rules by which the given TOP-RC pool is distributed between the Retirement Circle members.

The TOP-RC Electronic Contract is the full legal contract which describes the construction and distribution of TOP-RCs. The Electronic Contract is a contract between the participants of the RC, which states the rules, regulations and the agreement of applying and being included in a TOP-RC.

One may call an Account Platform the Recordkeeper, Third-Party Administrator, Brokerage or some form of an Online Platform which has a UI interface and information about the retiree and their portfolio. A TOP-RC Platform to enable TOP-RCs is built in collaboration with an existing Account Platform, which either by default or by voluntary manual entry of the individual has information on individual's subset of personal information (as age, gender, profession) and the portfolio they hold.

Next, let us give more details on CCP and PDP, before we describe the details of the interaction of the Account Platform with the TOP-RC Platform.

The performed analytical R&D showed the conditions which might make the Retirement Circles Stable (arriving at a certain "Recipe for Retirement Circle Stability"). From there, we know that in CCP apart from information as Circle Name, Lockup Period, Circle Theme, Gender and Admissible Ages, one needs to include these 3 conditions on:

Accepted Asset Sizes

Accepted Portfolio Restrictions

Circle Creation Criteria: minimum number of applicants needed to create the circle The 3 conditions above may be included as default in any CCP. As one goal is to make the Retirement Circles transparent and easy to understand, the CCP may be divided into 2 parts: CCP-Summary and CCP-Algorithm The CCP-Summary is made to act as an introduction to some of the main attributes of the given Retirement Circle.

In one embodiment, a CCP Algorithm is the code, which is used to create the Retirement Circles. That code may be made public, so that interested participants, advisors, sophisticated investors, auditors or regulatory organizations know in a transparent way how exactly the Retirement Circles are constructed. The algorithm would, of course, not show the (Personal Info, Portfolio Info) pairs available on the Account Platform, but would clearly show the code of how given such information the Retirement Circles are Created.

Similarly, the Pool Distribution Protocol includes: PDP-Summary and PDP-Pseudo Code. In one embodiment, PDP-Pseudo Code shows a given Pool Value and Circle Contract Value as input, given participant's premia is calculated. However, one way to make sure that the market does not take advantage of the RC Pool Liquidations, the full code of PDP may be kept from the public. In addition, the PDP might include proprietary algorithms and methodologies of liquidating the pool.

The PDP-Summary may provide an introduction to the main attributes of how the Pool is distributed. Again, given the previous R&D the PDP may show to each participant their Multiplier and the Multiplier Table so that the participant can understand how much more/less they will get in comparison to participants of different ages.

In one embodiment, where CCP conditions on creating TOP-RCs are only with similar assets and reasonably large number of participants, TOP-RC's are very unlikely to have issue which Tontines have: risk of some participants causing the death of others to increase their own premia. The reasoning was that given similar balances (e.g., $100k) and a large-enough number of people in each TOP-RC (e.g., 10k) each participant's interest in other participant's death is very small in monetary terms (e.g., 10$). However, to increase the possible psychological comfort of the RC members, apart from making sure their identity is kept secret, the PDP may incorporate a Randomization Condition. The Randomization Condition may randomly subdivide circle members into 2-4 sub-circles before the distribution of the Pool. As a result, even if one circle member wants to hurt another, they still don't know if the "tiny monetary gain" (e.g., the 10$) will be paid to them or not.

Next, the TOP-RC Platform includes:
Universe of TOP-RC Objects
Pitching Algorithm The pitching algorithm may interact between the Universe of the existing TOP-RCs and the Account Platform Subset including (id, personal info, portfolio info) triplets. Secure matching of unique id numbers to the people identities may be placed in an outsourced secured location according to relevant financial regulations. As the TOP-RC comes to its end date, discovery of person's mortality status gets updated based on government and other records by a 3rd party. The discovery period is the period between the end of the Retirement Circle and the time when the discovery of participant's life status is completed. In the TOP-RC agreement it may be established that any person whose life status was not discovered by the end of the discovery period is assumed to be alive and their assets are unlocked. In such an embodiment, this would affect a minority of the RC-members. However, since the TOP-RC is a contract between the RC participants, the RC participants may make clear about the aforementioned rule.

Thematic Open Platform Retirement Circle (TOP-RC) (or circle) is a new design/object which includes:
Circle Creation Protocol (CCP), which includes
CCP-Summary (designed based on the R&D)
CCP-Code
Pool Distribution Protocol (PDP), which includes
PDP-Summary (designed based on the R&D)
PDP-Code
TOP-RC Electronic Contract between the RC circle members
TOP-RC Platform is a platform includes:
Universe of TOP-RC objects
TOP-RC Pitching Algorithm
Further architecture to support TOP-RC creation and distribution

TPCD

Figure 1B:
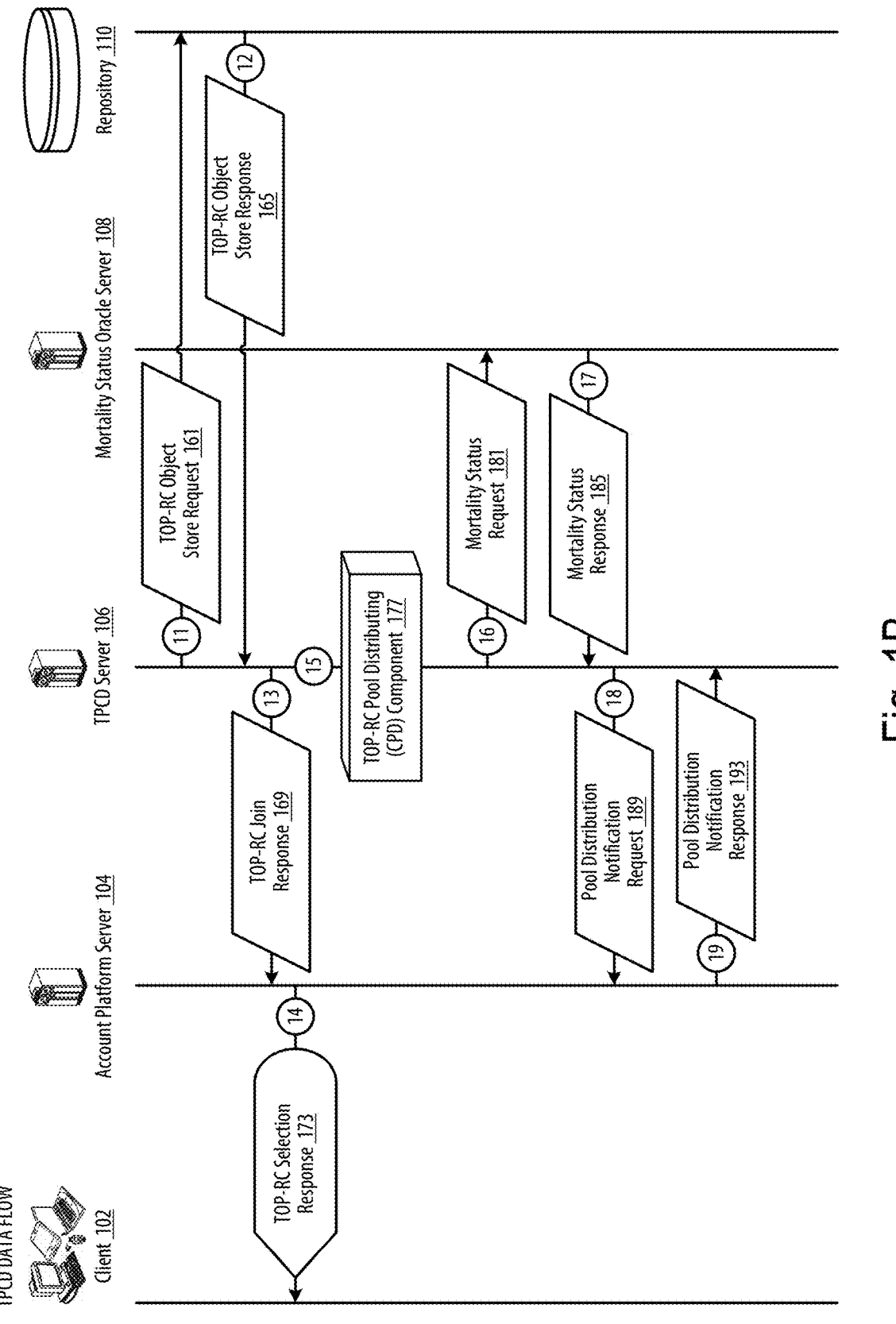

FIG. 1 shows non-limiting, example embodiments of a datagraph illustrating data flow(s) for the TPCD. In FIG. 1, a client 102 (e.g., of a user) may send a thematic open protocol (TOP) retirement circle (RC) search request 121 to an account platform server 104 to facilitate searching for TOP-RC templates (or objects) that match a set of user preferences specified by the user. For example, the client may be a desktop, a laptop, a tablet, a smartphone, a smartwatch, and/or the like that is executing a client application. In one implementation, the TOP-RC search request may include data such as a request identifier, a user object identifier, a portfolio selection, TOP-RC user preferences, and/or the like. In one embodiment, the client may provide the following example TOP-RC search request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS X)
```

```
AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXXXD</client_UDID>
    <client_OS>iOS</client_OS>
    <client_OS_version>7.1.1</client_OS_version>
    <client_app_type>app with webkit</client_app_type>
    <app_installed_flag>true</app_installed_flag>
    <app_name>TPCD.appqapp_name>
    <app_version>1.0 </app_version>
    <app_webkit_name>Mobile Safari</client_webkit_name>
    <client_version>537.51.2</client_version>
  </client_details>
  <client_details> //iOS Client with Webbrowser
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXXXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
  </client_details>
  <client_details> //Android Client with Webbrowser
    <client_IP>10.0.0.123</client_IP>
    <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
    <client_product_type>Nexus S</client_product_type>
      <client_serial_number>YXXXXXXXXZ</client_serial_number>
      <client_UDID>FXXXXXXXXX-XXXX-XXXX-XXXX-XXXXXXXXXXXX</client_UDID>
      <client_OS>Android</client_OS>
      <client_OS_version>4.0.4</client_OS_version>
      <client_app_type>web browser</client_app_type>
      <client_name>Mobile Safari</client_name>
      <client_version>534.30</client_version>
  </client_details>
  <client_details>//Mac Desktop with Webbrowser
      <client_IP>10.0.0.123</client_IP>
      <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
      <client_product_type>MacPro5,1</client_product_type>
      <client_serial_number>YXXXXXXXXZ</client_serial_number>
      <client_UDID>FXXXXXXXXX-XXXX-XXXX-XXXX-XXXXXXXXXXXX</client_UDID>
      <client_OS>Mac OS X</client_OS>
      <client_OS_version>10.9.3</client_OS_version>
      <client_app_type>web browser</client_app_type>
      <client_name>Mobile Safari</client_name>
      <client_version>537.75.14</client_version>
  </client_details>
  <TOP_RC_search_request>
    <request_identifier>ID_request_1</request_identifier>
    <user_object_identifier>ID_user_1</user_object_identifier>
    <portfolio_selection>ID_individual_retirement_account_1</portfolio_selection>
    <TOP_RC_user_preferences>
      <circle_theme>Nurses</circle_theme>
      <circle_period>1 Year</circle_period>
      <ages>50+</ages>
      <asset_sizes>$10,000 - $100,000</asset_sizes>
      <accepted_investments>
        <investment>GAA Target Date Funds</investment>
        <investment>GAA Managed Retirement Funds</investment>
        <investment>Domestic Equity Funds</investment>
```

-continued

```
        </accepted_investments>
      </TOP_RC_user_preferences>
    </TOP_RC_search_request>
  </auth_request>
```

The account platform server 104 may send a TOP-RC match request 125 to a TPCD server 106 to facilitate finding TOP-RC templates (or objects) that match a set of criteria associated with the user object corresponding to the user. In one implementation, the TOP-RC match request may include data such as a request identifier, a user object, a portfolio object associated with the user object, TOP-RC user preferences, and/or the like. In one embodiment, the account platform server may provide the following example TOP-RC match request, substantially in the form of a HTTP(S) POST message including XML-formatted data, as provided below:

```
POST /TOP-RC_match_request.php HTTP/1.1
Host: www.server.com
Content-Type: Application/XML
Content-Length: 667
<?XML version ="1.0" encoding ="UTF-8"?>
<TOP_RC_match_request>
  <request_identifier>ID_request_2</request_identifier>
  <user_object>
    <user_object_identifier>ID_user_1</user_object_identifier>
    <age>60</age>
    <gender>Male</gender>
    <occupation>Nurse</occupation>
    <employer>Hospital Inc.</employer>
  </user_object>
  <portfolio_object>
    <portfolio_object_identifier>
      ID_individual_retirement_account_1
    </portfolio_object_identifier>
    <portfolio_size>$50,000</portfolio_size>
    <portfolio_investments>investments to be used for TOP-RC</portfolio_investments>
  </portfolio_object>
  <TOP_RC_user_preferences>
    <circle_theme>Nurses</circle_theme>
    <circle_period>1 Year</circle_period>
    <ages>50+</ages>
    <asset_sizes>$10,000 - $100,000</asset_sizes>
    <accepted_investments>
      <investment>GAA Target Date Funds</investment>
      <investment>GAA Managed Retirement Funds</investment>
      <investment>Domestic Equity Funds</investment>
    </accepted_investments>
  </TOP_RC_user_preferences>
</TOP_RC_match_request>
```

A TOP-RC templates matching (CTM) component 129 may utilize data provided in the TOP-RC match request to find TOP-RC templates (or objects) that match the set of criteria associated with the user object. See FIG. 2 for additional details regarding the CTM component.

The TPCD server 106 may send a TOP-RC templates retrieve request 133 to a repository 110 to determine matching TOP-RC templates (or objects) and/or to retrieve summary object data regarding the matching TOP-RC templates (or objects). In one implementation, the TOP-RC templates retrieve request may include data such as a request identifier, a database query, and/or the like. In one embodiment, the TPCD server may provide the following example TOP-RC templates retrieve request, substantially in the form of a HTTP(S) POST message including XML-formatted data, as provided below:

```
POST /TOP-RC_templates_retrieve_request.php HTTP/1.1
Host: www.server.com
Content-Type: Application/XML
Content-Length: 667
<?XML version = "1.0" encoding = "UTF-8"?>
<TOP_RC_templates_retrieve_request>
  <request_identifier>ID_request_3</request_identifier>
  <database_query>SQL query string</database_query>
</TOP_RC_templates_retrieve_request>
```

The repository 110 may send a TOP-RC templates retrieve response 137 to the TPCD server 106 with the requested TOP-RC template (or object) data. In one implementation, the TOP-RC templates retrieve response may include data such as a response identifier, the result set from executing the database query, and/or the like. In one embodiment, the repository may provide the following example TOP-RC templates retrieve response, substantially in the form of a HTTP(S) POST message including XML-formatted data, as provided below:

US 12,626,303 B2

11 12

```
POST /TOP-RC_templates_retrieve_response.php HTTP/1.1
Host: www.server.com
Content-Type: Application/XML
Content-Length: 667
<?XML version = "1.0" encoding = "UTF-8"?>
<TOP_RC_templates_retrieve_response>
   <response_identifier>ID_response_3</response_identifier>
   <TOP_RC_data>Result set from executing the SQL query</TOP_RC_data>
</TOP_RC_templates_retrieve_response>
```

The TPCD server 106 may send a TOP-RC match response 141 to the account platform server 104 with summary objects for matching TOP-RC templates (or objects). In one implementation, the TOP-RC match response may include data such as a response identifier, summary objects for matching TOP-RC templates (or objects), and/or the like. In one embodiment, the TPCD server may provide the following example TOP-RC match response, substantially in the form of a HTTP(S) POST message including XML-formatted data, as provided below:

```
POST /TOP-RC_match_response.php HTTP/1.1

Host: www.server.com

Content-Type: Application/XML

Content-Length: 667

<?XML version = "1.0" encoding = "UTF-8"?>

<TOP_RC_match_response>

<response_identifier>ID_response_2</response_identifier>

<TOP_RC_template>

<template_identifier>ID_TOP_RC_template_1</template_identifier>

<rank>100</rank>

<CCP_summary_object>

<circle_name>Nurses Preferred Retirement Circle</circle_name>

<circle_period>12+1 months</circle_period>

<ages>50 Years - 100 Years</ages>

<asset_sizes>$10,000 - $100,000</asset_sizes>

<portfolios>GAA Target Date Funds</portfolios>

<creation_criteria>1,000 applicants in each age group</creation_criteria>

<asset_lockup_date>At the time of application</asset_lockup_date>

<decision_date>2 weeks from the time of application</decision_date>

</CCP_summary_object>

<PDP_summary_object>

<multiplier>1.1%</multiplier>

<distribution>Multiplier * (Pool Value / Circle Value)</distribution>

<distribution_date>12+1 months after pool creation</distribution_date>

<asset_unlock_date>12+2 months after pool creation</asset_unlock_date>

<randomization>2 sub-circlesqrandomization>

</PDP_summary_object>

</TOP_RC_template>

<TOP_RC_template>

<template_identifier>ID_TOP_RC_template_2</template_identifier>

<rank>95</rank>

<CCP_summary_object>

<circle_name>Essential Workers Circle</circle_name>

...

</CCP_summary_object>

<PDP_summary_object>

<multiplier>1.1%</multiplier>

...

</PDP_summary_object>

</TOP_RC_template>

...

</TOP_RC_match_response>
```

The account platform server 104 may send a TOP-RC search response 145 to the client 102 to inform the user regarding the matching TOP-RC templates (or objects). In one implementation, the TOP-RC search response may include data such as a response identifier, summary object(s) for a (e.g., user-selected, best matching, etc.) matching TOP-RC template (or object), and/or the like. In one embodiment, the account platform server may provide the following example TOP-RC search response, substantially in the form of a HTTP(S) POST message including XML-formatted data, as provided below:

```
POST /TOP-RC_search_response.php HTTP/1.1
Host: www.server.com
Content-Type: Application/XML
Content-Length: 667
<?XML version = "1.0" encoding = "UTF-8"?>
<TOP_RC_search_response>
   <response_identifier>ID_response_1</response_identifier>
   <TOP_RC_template>
      <template_identifier>ID_TOP_RC_template_1</template_identifier>
      <rank>100</rank>
      <CCP_summary_object>
         <circle_name>Nurses Preferred Retirement Circle</circle_name>
         <circle_period>12+1 months</circle_period>
         <ages>50 Years - 100 Years</ages>
         <asset_sizes>$10,000 - $100,000</asset_sizes>
         <portfolios>GAA Target Date Funds</portfolios>
         <creation_criteria>1,000 applicants in each age group</creation_criteria>
         <asset_lockup_date>At the time of application</asset_lockup_date>
         <decision_date>2 weeks from the time of application</decision_date>
      </CCP_summary_object>
      <PDP_summary_object>
         <multiplier>1.1%</multiplier>
         <distribution>Multiplier * (Pool Value / Circle Value)</distribution>
         <distribution_date>12+1 months after pool creation</distribution_date>
         <asset_unlock_date>12+2 months after pool creation</asset_unlock_date>
         <randomization>2 sub-circles</randomization>
      </PDP_summary_object>
   </TOP_RC_template>
</TOP_RC_search_response>
```

The client 102 may send a TOP-RC selection request 149 to the account platform server 104 to facilitate selecting a matching TOP-RC to join. In one implementation, the TOP-RC selection request may include data such as a request identifier, a user object identifier, a portfolio selection, a TOP-RC template (or object) identifier, TOP-RC characteristics, and/or the like. In one embodiment, the client may provide the following example TOP-RC selection request, substantially in the form of a HTTP(S) POST message including XML-formatted data, as provided below:

```
POST /TOP-RC_selection_request.php HTTP/1.1
Host: www.server.com
Content-Type: Application/XML
Content-Length: 667
<?XML version = "1.0" encoding = "UTF-8"?>
<TOP_RC_selection_request>
   <request_identifier>ID_request_4</request_identifier>
   <user_object_identifier>ID_user_1</user_object_identifier>
   <portfolio_selection>ID_individual_retirement_account_1</portfolio_selection>
   <template_identifier>ID_TOP_RC_template_1</template_identifier>
   <characteristics>Year: 2022</characteristics>
</TOP_RC_selection_request>
```

The account platform server 104 may send a TOP-RC join request 153 to the TPCD server 106 to facilitate enrolling the user into the selected TOP-RC. In one implementation, the TOP-RC join request may include data such as a request identifier, a user object, a portfolio object associated with the user object, a TOP-RC template (or object) identifier, TOP- RC characteristics, and/or the like. In one embodiment, the account platform server may provide the following example TOP-RC join request, substantially in the form of a HTTP (S) POST message including XML-formatted data, as provided below:

```
POST /TOP-RC_join_request.php HTTP/1.1
Host: www.server.com
Content-Type: Application/XML
Content-Length: 667
<?XML version = "1.0" encoding = "UTF-8"?>
<TOP_RC_join_request>
    <request_identifier>ID_request_5</request_identifier>
    <user_object>
        <user_object_identifier>ID_user_1</user_object_identifier>
        <age>60</age>
        <gender>Male</gender>
        <occupation>Nurse</occupation>
        <employer>Hospital Inc.</employer>
    </user_object>
    <portfolio_object>
        <portfolio_object_identifier>
            ID_individual_retirement_account_1
        </portfolio_object_identifier>
        <portfolio_size>$50,000</portfolio_size>
        <portfolio_investments>investments to be used for TOP-RC</portfolio_investments>
    </portfolio_object>
    <template_identifier>ID_TOP_RC_template_1</template_identifier>
    <characteristics>Year: 2022</characteristics>
</TOP_RC_join_request>
```

A TOP-RC object creating (COC) component 157 may implement a circle creation protocol and may utilize data provided in the TOP-RC join request to enroll the user into the selected TOP-RC (e.g., including instantiating and/or activating a corresponding TOP-RC object). See FIG. 3 for additional details regarding the COC component.

The TPCD server 106 may send a TOP-RC object store request 161 to the repository 110 to store and/or to update an instantiated TOP-RC object corresponding to the selected TOP-RC. In one implementation, the TOP-RC object store request may include data such as a request identifier, a TOP-RC object, and/or the like. In one embodiment, the TPCD server may provide the following example TOP-RC object store request, substantially in the form of a HTTP(S) POST message including XML-formatted data, as provided below:

```
POST /TOP-RC_object_store_request.php HTTP/1.1
Host: www.server.com
Content-Type: Application/XML
Content-Length: 667
<?XML version = "1.0" encoding = "UTF-8"?>
<TOP_RC_object_store_request>
    <request_identifier>ID_request_6</request_identifier>
    <TOP_RC_object>
        <object_identifier>ID_TOP_RC_object_1</object_identifier>
        <associated_template_identifier>
            ID_TOP_RC_template_1
        </associated_template_identifier>
        <associated_pool_object_identifier>
            ID_pool_object_1
        </associated_pool_object_identifier>
        <characteristics>
            <circle_year>2022</circle_year>
            <instantiation_date>12/12/2021</instantiation_date>
            <creation_decision_date>12/26/2021</creation_decision_date>
            <activation_date>1/1/2022</activation_date>
            <expiration_date>1/1/2023</expiration_date>
        </characteristics>
        <associated_user_details>
            <user_object_identifier>ID_user_1</user_object_identifier>
            <portfolio_object_identifier>
                ID_individual_retirement_account_1
```

-continued

```
      </portfolio_object_identifier>
      <portfolio_investments>investments used for TOP-RC</portfolio_investments>
      <age_group>60-69</age_group>
      <multiplier>1.1%</multiplier>
    </associated_user_details>
  </TOP_RC_object>
</TOP_RC_object_store_request>
```

The repository 110 may send a TOP-RC object store response 165 to the TPCD server 106 to inform the TPCD server whether the TOP-RC object corresponding to the selected TOP-RC was stored and/or updated successfully. In one implementation, the TOP-RC object store response may include data such as a response identifier, a status, and/or the like. In one embodiment, the repository may provide the following example TOP-RC object store response, substantially in the form of a HTTP(S) POST message including XML-formatted data, as provided below:

```
POST /TOP-RC_object_store_response.php HTTP/1.1
Host: www.server.com
Content-Type: Application/XML
Content-Length: 667
<?XML version = "1.0" encoding = "UTF-8"?>
<TOP_RC_object_store_response>
  <response_identifier>ID_response_6</response_identifier>
  <status>OK</status>
</TOP_RC_object_store_response>
```

The TPCD server 106 may send a TOP-RC join response 169 to the account platform server 104 to inform the account platform server whether the user was enrolled into the selected TOP-RC successfully. In one implementation, the TOP-RC join response may include data such as a response identifier, enrollment status details, and/or the like. In one embodiment, the TPCD server may provide the following example TOP-RC join response, substantially in the form of a HTTP(S) POST message including XML-formatted data, as provided below:

```
POST /TOP-RC_join_response.php HTTP/1.1
Host: www.server.com
Content-Type: Application/XML
Content-Length: 667
<?XML version = "1.0" encoding = "UTF-8"?>
<TOP_RC_join_response>
  <response_identifier>ID_response_5</response_identifier>
  <enrollment_status_details>
    <user_enrolled>TRUE</user_enrolled>
    <creation_decision_date>12/26/2021</creation_decision_date>
  </enrollment_status_details>
</TOP_RC_join_response>
```

The account platform server 104 may send a TOP-RC selection response 173 to the client 102 to inform the user regarding the user's enrollment status (e.g., whether the user was able to enroll, when the user will be informed whether the creation criteria for the selected TOP-RC have been met, etc.). In one implementation, the TOP-RC selection response may include data such as a response identifier, enrollment status details, and/or the like. In one embodiment, the account platform server may provide the following example TOP-RC selection response, substantially in the form of a HTTP(S) POST message including XML-formatted data, as provided below:

```
POST /TOP-RC_selection_response.php HTTP/1.1
Host: www.server.com
Content-Type: Application/XML
Content-Length: 667
<?XML version = "1.0" encoding = "UTF-8"?>
<TOP_RC_selection_response>
  <response_identifier>ID_response_4</response_identifier>
  <enrollment_status_details>
    <user_enrolled>TRUE</user_enrolled>
    <creation_decision_date>12/26/2021</creation_decision_date>
  </enrollment_status_details>
</TOP_RC_selection_response>
```

A TOP-RC pool distributing (CPD) component 177 may implement a pool distribution protocol to determine a pool distribution allocation and/or corresponding account platform allocation actions for each user object associated with the TOP-RC object. See FIG. 4 for additional details regarding the CPD component.

The TPCD server 106 may send a mortality status request 181 to a mortality status oracle server 108 to facilitate determining user mortality status for users associated with the TOP-RC object. In one implementation, the mortality status request may include data such as a request identifier, a user identifier, a user social security number (SSN), and/or the like. In one embodiment, the TPCD server may provide the following example mortality status request, substantially in the form of a HTTP(S) POST message including XML-formatted data, as provided below:

```
POST /mortality_status_request.php HTTP/1.1
Host: www.server.com
Content-Type: Application/XML
Content-Length: 667
<?XML version = "1.0" encoding = "UTF-8"?>
<mortality_status_request>
  <request_identifier>ID_request_7</request_identifier>
  <user_object_identifier>ID_user_1</user_object_identifier>
  <user_SSN>123-45-6789</user_SSN>
</mortality_status_request>
```

The mortality status oracle server 108 may send a mortality status response 185 to the TPCD server 106 with the requested user mortality status. In one implementation, the mortality status response may include data such as a response identifier, the requested user mortality status, and/or the like. In one embodiment, the mortality status oracle server may provide the following example mortality status response, substantially in the form of a HTTP(S) POST message including XML-formatted data, as provided below:

```
POST /mortality_status_response.php HTTP/1.1
Host: www.server.com
Content-Type: Application/XML
Content-Length: 667
<?XML version = "1.0" encoding = "UTF-8"?>
<mortality_status_response>
```

-continued

```
<response_identifier>ID_response_7</response_identifier>
<user_mortality_status>LIVING</user_mortality_status>
</mortality_status_response>
```

The TPCD server 106 may send a pool distribution notification request 189 to the account platform server 104 to provide a pool distribution notification for the account platform server (e.g., including account platform allocation actions for the user object associated with the user). In one implementation, the pool distribution notification request may include data such as a request identifier, pool distribution notification data, and/or the like. In one embodiment, the TPCD server may provide the following example pool distribution notification request, substantially in the form of a HTTP(S) POST message including XML-formatted data, as provided below:

```
POST /pool_distribution_notification_request.php HTTP/1.1
Host: www.server.com
Content-Type: Application/XML
Content-Length: 667
<?XML version = "1.0" encoding = "UTF-8"?>
<pool_distribution_notification_request>
   <request_identifier>ID_request_8</request_identifier>
   <pool_distribution_notification_data>
      <TOP_RC_object_identifier>ID_TOP_RC_object_1</TOP_RC_
      object_identifier>
      <pool_object_identifier>ID_pool_object_1</pool_object_identifier>
      <user_data>
         <user_object_identifier>ID_user_1</user_object_identifier>
         <portfolio_object_identifier>
            ID_individual_retirement_account_1
         </portfolio_object_identifier>
         <portfolio_investments>investments used for TOP-RC</portfolio_
         investments>
         <portfolio_action>UNLOCK</portfolio_action>
         <pool_distribution_type>CASH</pool_distribution_type>
         <pool_distribution_allocation>$2,000</pool_distribution_
         allocation>
         <account_platform_allocation_actions>
            Liquidate securities S of pool object pool_object_
            identifier on date D at time T and credit
            portfolio_object_identifier account
            pool_distribution_allocation in pool_distribution_type format
         </account_platform_allocation_actions>
      </user_data>
      <user_data>
         <user_object_identifier>ID_user_2</user_object_identifier>
         ...
         <account_platform_allocation_actions>
         ...
         </account_platform_allocation_actions>
      </user_data>
      ...
   </pool_distribution_notification_data>
</pool_distribution_notification_request>
```

The account platform server 104 may send a pool distribution notification response 193 to the TPCD server 106 to confirm that the pool distribution notification request was received successfully. In one implementation, the pool distribution notification response may include data such as a response identifier, a status, and/or the like. In one embodiment, the account platform server may provide the following example pool distribution notification response, substantially in the form of a HTTP(S) POST message including XML-formatted data, as provided below:

```
POST /pool_distribution_notification_response.php HTTP/1.1
Host: www.server.com
Content-Type: Application/XML
Content-Length: 667
<?XML version = "1.0" encoding = "UTF-8"?>
<pool_distribution_notification_response>
      <response_identifier>ID_response_8</response_identifier>
      <status>OK</status>
</pool_distribution_notification_response>
```

Figure 2:
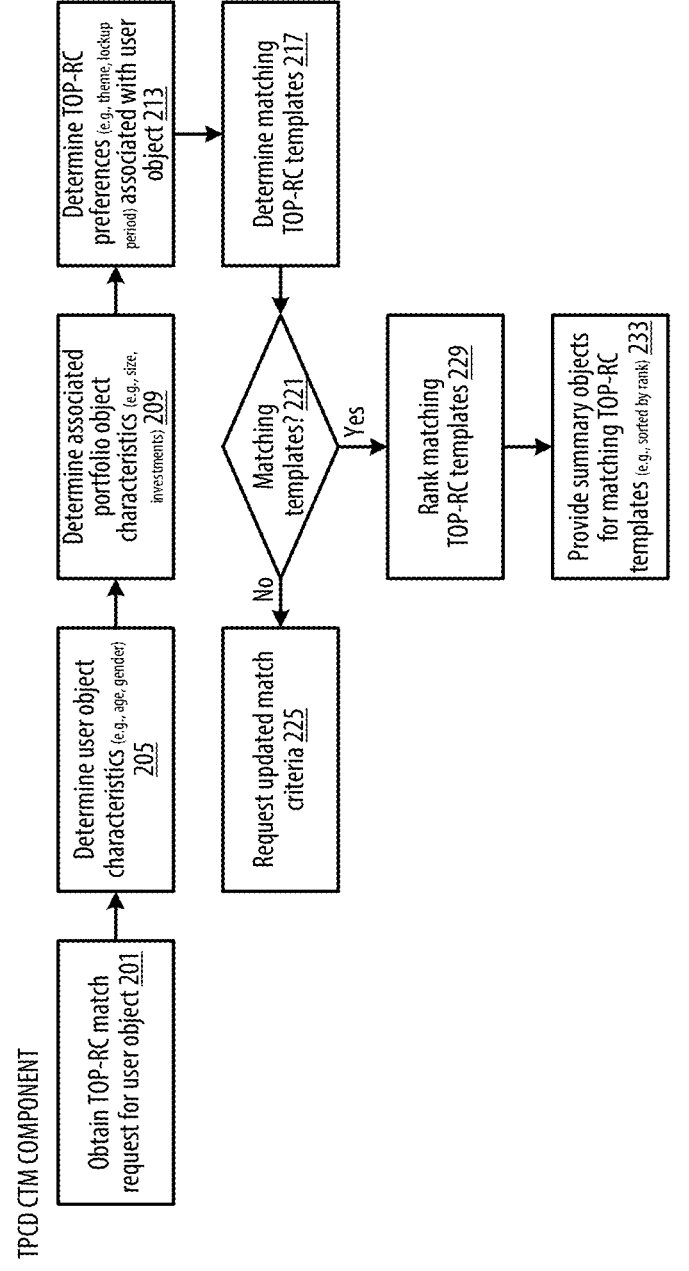
FIG. 2 shows non-limiting, example embodiments of a logic flow illustrating a TOP-RC templates matching (CTM) component for the TPCD.

FIG. 2 shows non-limiting, example embodiments of a logic flow illustrating a TOP-RC templates matching (CTM) component for the TPCD. In FIG. 2, a TOP-RC match request for a user object associated with a user may be obtained at 201. For example, the TOP-RC match request for the user object may be obtained as a result of a request from an account platform server to find TOP-RC templates that match a set of criteria associated with the user object. In an alternative embodiment, the CTM component may instead be used to find TOP-RC objects that match the set of criteria associated with the user object.

User object characteristics associated with the user object may be determined at 205. For example, user object characteristics may include age, gender, location, occupation, employer, and/or the like. In one embodiment, user object characteristics may be used as search parameters to find TOP-RC templates that match the specified user object characteristics (e.g., to find TOP-RC templates that specify an age range that includes the age associated with the user object) and/or to determine pool distribution information (e.g., multiplier, distribution size) for a TOP-RC template that is applicable to the user object. In one implementation, the TOP-RC match request may be parsed (e.g., using PHP commands) to determine the user object characteristics associated with the user object (e.g., based on the value of the user_object field).

Portfolio object characteristics of a portfolio object associated with the user object may be determined at 209. For example, portfolio object characteristics may include portfolio size, portfolio investments (e.g., identifiers, sizes, etc. of investments (e.g., user selected portfolio constituents, any available portfolio constituents)), account type (e.g., brokerage, 401(k), IRA), and/or the like. In one embodiment, portfolio object characteristics may be used as search parameters to find TOP-RC templates that match the specified portfolio object characteristics (e.g., to find TOP-RC templates that specify accepted investments that include at least one investment associated with the portfolio object). In one implementation, the TOP-RC match request may be parsed (e.g., using PHP commands) to determine the portfolio object characteristics associated with the portfolio object (e.g., based on the value of the portfolio_object field).

TOP-RC user preferences associated with the user object may be determined at 213. For example, TOP-RC user preferences (e.g., specified by a user associated with the user object) may include circle theme (e.g., TOP-RC templates for nurses, TOP-RC templates for essential workers), circle lockup period (e.g., 1 year, 3 years, 5 years), ages, asset sizes, and/or the like. In one embodiment, TOP-RC user preferences may be used as search parameters to find TOP-RC templates that match the specified TOP-RC user preferences (e.g., to find TOP-RC templates that specify acceptable portfolio asset sizes that correspond to the asset sizes TOP-RC user preference). In one implementation, the TOP-RC match request may be parsed (e.g., using PHP commands) to determine the TOP-RC user preferences associated with the user object (e.g., based on the value of the TOP_RC_user_preferences field).

Matching TOP-RC templates may be determined at 217. In one implementation, TOP-RC templates that satisfy the set of criteria (e.g., the user object characteristics, the portfolio object characteristics, and/or the TOP-RC user preferences) associated with the user object may be found. It is to be understood that, in some embodiments, the determined TOP-RC templates may not have to match all criteria in the set of criteria to be considered matching (e.g., TOP-RC templates that match at least a threshold subset of criteria (e.g., 70%) may be considered matching). For example, the matching TOP-RC templates may be determined via a MySQL database command similar to the following:

```
SELECT RC_TemplateID
FROM RC_Templates
WHERE RC_TemplateAgeMin <= 60 AND RC_TemplateAgeMax >= 60
AND
    RC_TemplateAssetSizeMin <= 50000 AND RC_
    TemplateAssetSizeMax >= 50000 AND
    RC_TemplatePeriod = '1 Year' ;
```

As stated above, in some alternative embodiments, matching TOP-RC objects may be determined, instead of TOP-RC templates, in a similar manner A determination may be made at 221 whether any matching TOP-RC templates have been found. If no matching TOP-RC templates have been found, updated match criteria may be requested at 225. In one implementation, the account platform server may be informed that no matching TOP-RC templates have been found, and the account platform server may prompt the user for updated match criteria (e.g., a different portfolio account, different investments, different TOP-RC user preferences).

If matching TOP-RC templates have been found, the matching TOP-RC templates may be ranked at 229. For example, a rank may be expressed as a percentage, as a score, as a label (e.g., good, better, best), and/or the like. In one embodiment, a rank may indicate how well a matching TOP-RC template satisfies the set of criteria. In one implementation, the matching TOP-RC templates may be ranked using a MySQL RANK( ) function.

Summary objects for the matching TOP-RC templates may be provided at 233. For example, the summary objects for the matching TOP-RC templates may include a circle creation protocol (CCP) summary object (e.g., that includes data fields with summary information regarding the main attributes of a corresponding TOP-RC template) and/or a pool distribution protocol (PDP) summary object (e.g., that includes data fields with summary information regarding how assets assigned to a pool object associated with a TOP-RC object that is based on a corresponding TOP-RC template are distributed). In one implementation, the summary objects for a matching TOP-RC template may be generated (e.g., using PHP commands that utilize summary information retrieved via MySQL database commands based on the RC_TemplateID of the matching TOP-RC template) and/or may be provided (e.g., along with the rank of the matching TOP-RC template) via a TOP-RC match response.

Figure 3:
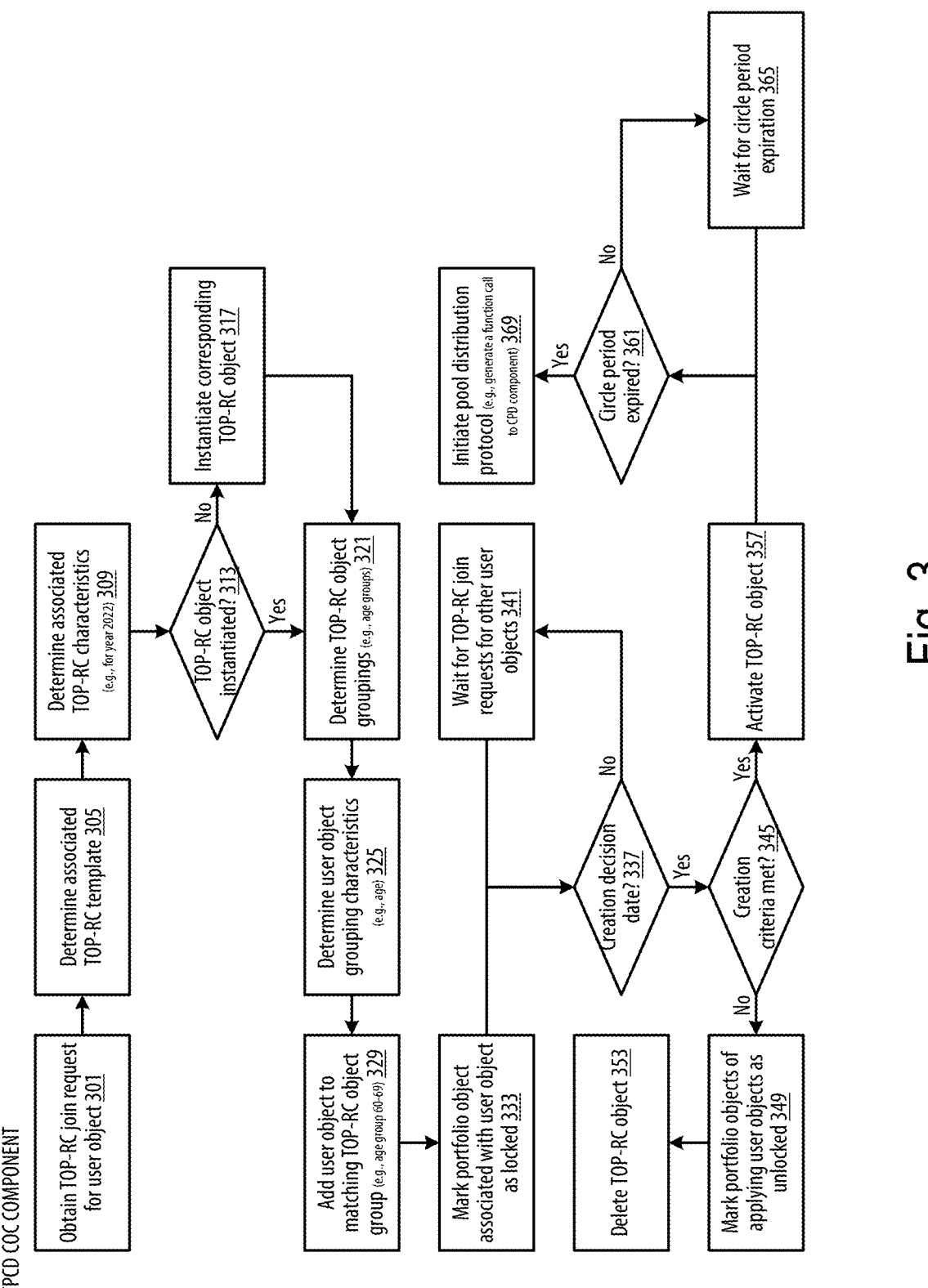
FIG. 3 shows non-limiting, example embodiments of a logic flow illustrating a TOP-RC object creating (COC) component for the TPCD.

FIG. 3 shows non-limiting, example embodiments of a logic flow illustrating a TOP-RC object creating (COC) component for the TPCD. In FIG. 3, a TOP-RC join request for a user object associated with a user may be obtained at 301. For example, the TOP-RC join request for the user object may be obtained as a result of a request from an account platform server to add the user object to a set of user objects associated with a TOP-RC object corresponding to a user selected TOP-RC to join.

A TOP-RC template associated with the TOP-RC join request may be determined at 305. For example, one of the matching TOP-RC templates provided by the CTM component may be selected by the user and specified by the account platform server in the TOP-RC join request. In one embodiment, the TOP-RC template may specify how to structure a corresponding TOP-RC object. In one implementation, the TOP-RC join request may be parsed (e.g., using PHP commands) to determine the TOP-RC template (e.g., based on the value of the template_identifier field).

TOP-RC characteristics associated with the TOP-RC join request may be determined at 309. In one embodiment, multiple TOP-RC objects may be instantiated based on the TOP-RC template, and the TOP-RC characteristics may identify a TOP-RC object to which the user object should be added. For example, multiple TOP-RC objects based on a "Nurses Circle with a 3-year circle period" TOP-RC template may be instantiated (e.g., starting in 2021, 2022, 2023, etc.) and the TOP-RC characteristics may specify a year (e.g., 2022) that identifies the proper TOP-RC object. In one implementation, the TOP-RC join request may be parsed (e.g., using PHP commands) to determine the TOP-RC characteristics (e.g., based on the value of the characteristics field).

A determination may be made at 313 whether the TOP-RC object corresponding to the TOP-RC template and/or to the TOP-RC characteristics has already been instantiated. For example, the corresponding TOP-RC object may have been previously instantiated when a prior TOP-RC join request for another user object was processed. If the corresponding TOP-RC object has not been previously instantiated, the corresponding TOP-RC object may be instantiated based on the TOP-RC template (e.g., using the TOP-RC characteristics as parameters during instantiation) at 317.

Groupings associated with the corresponding TOP-RC object may be determined at 321. In one embodiment, the TOP-RC object may be structured to add user objects into different groups (e.g., group objects). For example, the TOP-RC object may be structured to add user objects into different age groups (e.g., five age groups: 50-59 years, 60-69 years, 70-79 years, 80-89 years, and 90-99 years). In one implementation, the groupings may be determined based on data fields of the TOP-RC template (or of the TOP-RC object). For example, the groupings associated with the TOP-RC object may be determined via a MySQL database command similar to the following:

```
SELECT RC_TemplateAgeGroupings
FROM RC_Templates
WHERE RC_TemplateID = ID_TOP_RC_template_1;
```

Grouping characteristics associated with the user object may be determined at 325. For example, the age (e.g., the user is 60 years old) associated with the user object may be determined. In one implementation, the TOP-RC join request may be parsed (e.g., using PHP commands) to determine the grouping characteristics associated with the user object (e.g., based on the value of the user_object field).

The user object may be added to the matching TOP-RC object group (e.g., age group) at 329. For example, the user object may be added to a matching age group object of the TOP-RC object. In one implementation, the grouping characteristics associated with the user object may be evaluated with regard to the groupings of the TOP-RC object to determine the matching group (e.g., 60-69 years age group if the user is 60 years old). For example, the user object may be added to the matching TOP-RC object group via a MySQL database command similar to the following:

```
INSERT INTO RC_Objects (RC_ObjectID, RC_
ObjectAssociatedUserIDs,
    RC_ObjectAssociatedUserAgeGroupIDs, RC_
    ObjectAssociatedPortfolioIDs)
    VALUES (ID_TOP_RC_object_1, ID_user_1,
    ID_AgeGroup60_69, ID_individual_retirement_account_1);
```

A portfolio object associated with the user object may be marked as locked at 333. In one embodiment, the portfolio object may specify investment objects (e.g., corresponding to committed portfolio investments) to be used with the TOP-RC object. For example, a portfolio object identifier may be specified, and investment objects associated with the portfolio object identifier may be designated for use with the TOP-RC object and may be marked as locked. In another example, a set of portfolio investment objects may be specified, and the specified investment objects (e.g., associated with the portfolio object identifier) may be designated for use with the TOP-RC object and may be marked as locked. In one embodiment, a locked status indicates that the user may trade assets associated with a locked investment object, but may not withdraw the assets. In one implementation, a flag associated with the portfolio object and/or flags associated with the investment objects may be set to indicate the locked status.

A determination may be made at 337 whether the creation decision date for the TOP-RC object has been reached. In one embodiment, the creation decision date may be the date when a decision is made (e.g., based on creation criteria) whether to create the user selected TOP-RC. While the creation decision date for the TOP-RC object has not been reached, the TPCD may wait and process TOP-RC join requests for other user objects at 341. When the creation decision date for the TOP-RC object has been reached, a determination may be made at 345 whether the creation criteria for the TOP-RC object have been met. In one embodiment, the creation criteria may be structured to ensure retirement circle stability. In various implementations, the creation criteria may include specifications (e.g., minimum and/or maximum) for metrics such as the number of applicants, the applicant asset ratio deviation, the applicant portfolio return ratio deviation, the portfolio investments size, and/or the like. For example, the creation criteria for the TOP-RC object (e.g., as defined in the TOP-RC template) may specify the number (e.g., a minimum and/or a maximum) of user objects (e.g., at least 1,000 user objects) that should be associated with each group (e.g., with each of the five age groups) of the TOP-RC object and/or in total (e.g., at least 10,000 user objects) for the TOP-RC object to satisfy the creation criteria. In another example, the creation criteria for the TOP-RC object may specify the amount (e.g., a minimum and/or a maximum) of committed portfolio investments (e.g., at least $1M) that should be associated with each group (e.g., with each of the five age groups) of the TOP-RC object and/or in total (e.g., at least $10M) for the TOP-RC object to satisfy the creation criteria.

If the creation criteria for the TOP-RC object have not been met (e.g., the user selected TOP-RC is not going to be created), portfolio objects associated with applying user objects may be marked as unlocked at 349. In one implementation, a flag associated with an applying user object's portfolio object and/or flags associated with the applying user object's investment objects may be cleared to indicate the unlocked status. The TOP-RC object may be deleted at 353. For example, the account platform server may be informed that the applying user objects have not been accepted into the retirement cercle and then the TOP-RC object may be removed or reset.

If the creation criteria for the TOP-RC object have been met (e.g., the user selected TOP-RC is going to be created), the TOP-RC object may be activated at 357. For example, the account platform server may be informed that the applying user objects have been accepted into the retirement cercle and/or the circle period may be started on the activation date. A determination may be made at 361 whether the circle period has expired. While the expiration date for the TOP-RC object has not been reached, the TPCD may wait for the circle period expiration at 365. When the expiration date for the TOP-RC object has been reached, a pool distribution protocol may be initiated at 369. In one implementation, a pool distribution request associated with the TOP-RC object may be generated as a function call to the CPD component.

Figure 4:
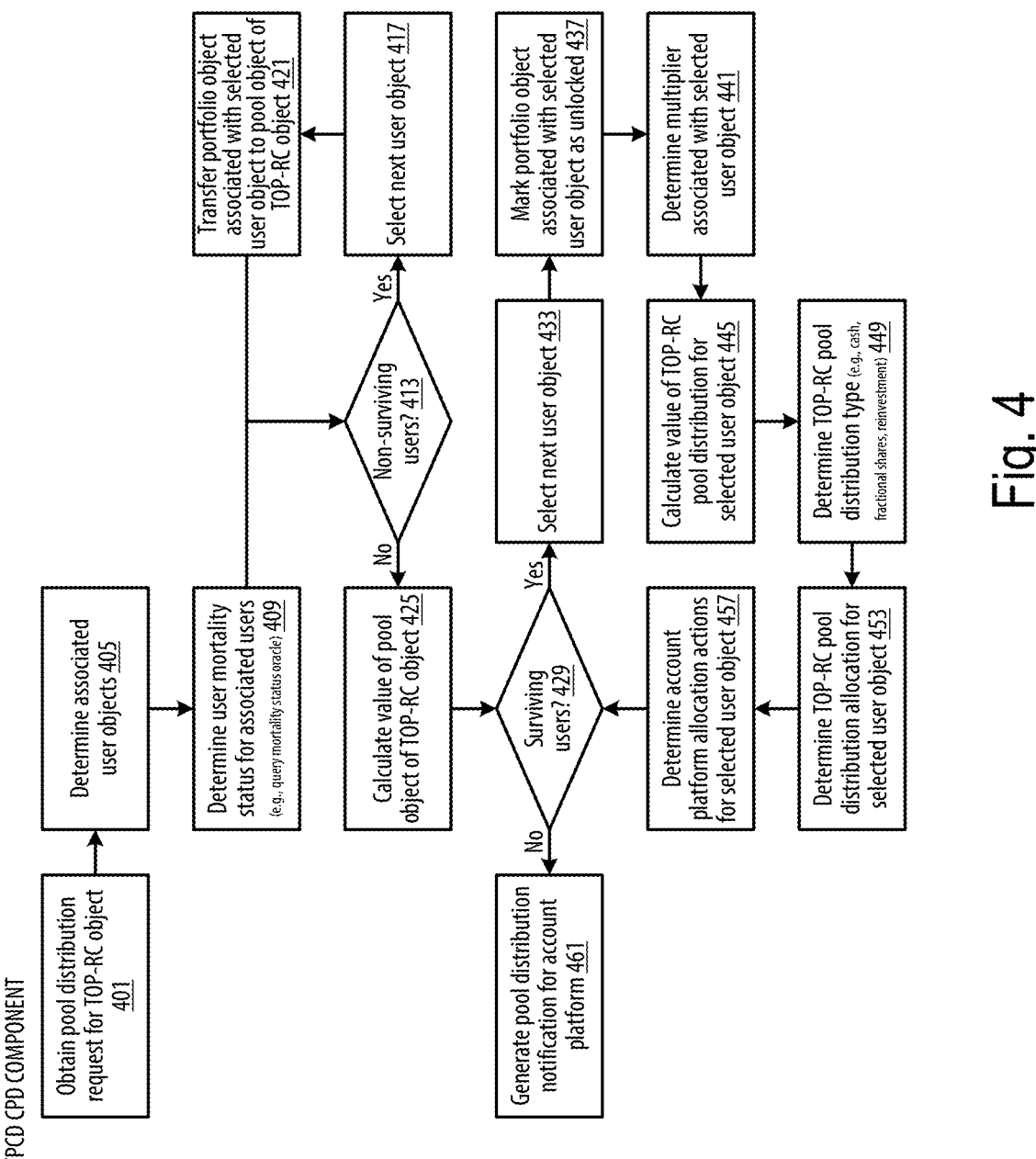
FIG. 4 shows non-limiting, example embodiments of a logic flow illustrating a TOP-RC pool distributing (CPD) component for the TPCD.

FIG. 4 shows non-limiting, example embodiments of a logic flow illustrating a TOP-RC pool distributing (CPD) component for the TPCD. In FIG. 4, a pool distribution request for a TOP-RC object may be obtained at 401. For example, the pool distribution request for the TOP-RC object may be obtained as a result of a function call from the CDC component indicating that the expiration date for the TOP-RC object has been reached.

User objects associated with the TOP-RC object may be determined at 405. In one implementation, the associated user objects may be determined based on the TOP-RC object identifier (e.g., provided in the pool distribution request). For example, the associated user objects may be determined via a MySQL database command similar to the following:
    SELECT RC_ObjectAssociatedUserIDs
    FROM RC_Objects
    WHERE RC_ObjectID=ID_TOP_RC_object_1;

User mortality status for users corresponding to the associated user objects may be determined at 409. In one embodiment, a mortality status for a user may be determined using government records, other third party records, and/or the like. For example, a mortality status oracle server (e.g., a web service that provides a user's mortality status based on a user identifier (e.g., the user's social security number and/or name)) may be queried to determine a user's mortality status. In one implementation, a user's mortality status may be determined via a mortality status request to a mortality status oracle server. In another implementation, the pool distribution protocol for the TOP-RC object may be implemented as a smart contract on a blockchain (e.g., an Ethereum smart contract), and the smart contract may send a mortality status request to a mortality status oracle server to determine a user's mortality status. In one embodiment, the TPCD may be structured to contribute investment returns of non-surviving users as circle yield to surviving users based on the determined mortality status for the users.

A determination may be made at 413 whether there remain non-surviving users to process. In one implementation, each of the non-surviving users may be processed. If there remain non-surviving users to process, the user object corresponding to the next non-surviving user may be selected at 417.

The portfolio object associated with the selected user object may be transferred from the selected user object to a pool object of the TOP-RC object at 421. For example, the assets associated with the portfolio object may be transferred. In one embodiment, the pool object may be a portfolio object that comprises portfolio objects and/or investment objects transferred from user objects associated with the non-surviving users. In one implementation, the portfolio object may be assigned to the pool object. In another implementation, investment objects of the portfolio object that are designated for use with the TOP-RC object may be assigned to the pool object.

The value of the pool object of the TOP-RC object may be calculated at 425. In one embodiment, the value of the pool object may be the sum of the values of portfolio objects and/or investment objects associated with the pool object. In one implementation, investments corresponding to portfolio objects and/or investment objects associated with the pool object may be liquidated, and the liquidated cash value may be the value of the pool object. In another implementation, the value of the pool object may be calculated as the sum of fair market values (e.g., end of day closing prices) of investments corresponding to portfolio objects and/or investment objects associated with the pool object as of a particular date (e.g., the expiration date associated with the TOP-RC object, the liquidation date associated with the TOP-RC object) and/or set of dates (e.g., as an average of values during the month following the expiration date associated with the TOP-RC object).

A determination may be made at 429 whether there remain surviving users to process. In one implementation, each of the surviving users may be processed. If there remain surviving users to process, the user object corresponding to the next surviving user may be selected at 433.

A portfolio object associated with the selected user object may be marked as unlocked at 437. In one embodiment, an unlocked status indicates that a user may trade and withdraw assets associated with the portfolio object without regard to the TOP-RC object. In one implementation, a flag associated with the selected user object's portfolio object and/or flags associated with the selected user object's investment objects may be cleared to indicate the unlocked status.

A multiplier associated with the selected user object may be determined at 441. In one implementation, the multiplier may indicate the retirement circle share (e.g., the share of the value of the pool object) to be allocated for the selected user object. For example, the multiplier associated with the selected user object may be determined via a MySQL database command similar to the following:

```
SELECT RC_ObjectMultipliers
FROM RC_Objects
WHERE RC_ObjectID = ID_TOP_RC_object_1 AND
RC_ObjectAssociatedUserIDs = ID_user_1;
```

The value of a TOP-RC pool distribution (e.g., yield) for the selected user object may be calculated at 445. In one embodiment, the value of the TOP-RC pool distribution for the selected user object may be calculated using a distribution size formula associated with the TOP-RC object (e.g., based on the multiplier and/or the invested portfolio associated with the selected user object). For example, the distribution value may be calculated as follows:

Distribution Value = Invested Portfolio Size * Distribution Size
Distribution Size = Multiplier * (Pool Value / Circle Value)
where Pool Value and Circle Value are defined as follow:

-continued

For a given age j, denote the number of participants who joined a given retirement circle to be $n_j$. Next, assume that the participant i of age j with circle share multiplier $m_j$ and mortality outcome $\delta_{i,j}$, has invested portfolio of size $p_{i,j}$, whose return was $(1 + r_{i,j})$. If we denote $P_{i,j} := p_{i,j}(1 + r_{i,j})$ and let the ages in the circle be from a to b, we get:
Pool Value = $\Sigma_{j\in[a,b]}\Sigma_{j-1}{}^{nj}P_{i,j}\delta_{i,j}$
Circle Value = $\Sigma_{j\in[a,b]}\Sigma_{j-1}{}^{nj}P_{i,j}m_j(1 - \delta_{i,j})$
where Multiplier is the circle share multiplier m associated with the selected user object,
where Invested Portfolio Size is the invested portfolio of size p whose return was (1 + r) associated with the selected user object.

In some implementations, circle members may be subdivided into a set of sub-circles (e.g., into 2-4 random sub-circles) before calculating the value of the TOP-RC pool distribution to reduce any potential gain for any user from the death of any other user.

A TOP-RC pool distribution type for the selected user object may be determined at 449. In one embodiment, the TOP-RC pool distribution type for the selected user object may be cash (e.g., liquidating investments associated with the pool object), fractional shares (e.g., of the investments associated with the pool object), reinvestment (e.g., into investments associated with the portfolio object of the selected user object), and/or the like. For example, the TOP-RC pool distribution type for the selected user object may be determined via a MySQL database command similar to the following:

```
SELECT RC_ObjectDistributionTypes
FROM RC_Objects
WHERE RC_ObjectID = ID_TOP_RC_object_1 AND
RC_ObjectAssociatedUserIDs = ID_user_1;
```

A TOP-RC pool distribution allocation for the selected user object may be determined at 453. In one implementation, the TOP-RC pool distribution allocation for the selected user object may be determined based on the investments associated with the pool object, the value of the TOP-RC pool distribution for the selected user object, and/or the TOP-RC pool distribution type for the selected user object. For example, if the value of the TOP-RC pool distribution for the selected user object is $2,000 and the TOP-RC pool distribution type for the selected user object is cash, the TOP-RC pool distribution allocation for the selected user object may be determined as $2,000 in cash from liquidating investments associated with the pool object. In another example, if the value of the TOP-RC pool distribution for the selected user object is $2,000 and the TOP-RC pool distribution type for the selected user object is fractional shares, the TOP-RC pool distribution allocation for the selected user object may be determined as $2,000 worth of shares of an investment fund associated with the pool object.

Account platform allocation actions for the selected user object may be determined at 457. In one embodiment, the allocation actions may specify the actions that an account platform associated with the selected user object should take to facilitate transferring the TOP-RC pool distribution allocation for the selected user object to the selected user object's portfolio object. For example, the account platform allocation actions for the selected user object may be as follows:

Liquidate securities S of pool object ID_pool_object_1 on date
D at time T and credit ID_individual_retirement_account_1
account $2,000 in CASH format A pool distribution notification for the account platform may be generated at 461. For example, the pool distribution notification may include account platform allocation actions for a set of user objects associated with the account platform. In one implementation, the pool distribution notification may be sent via a pool distribution notification request.

Figure 5:
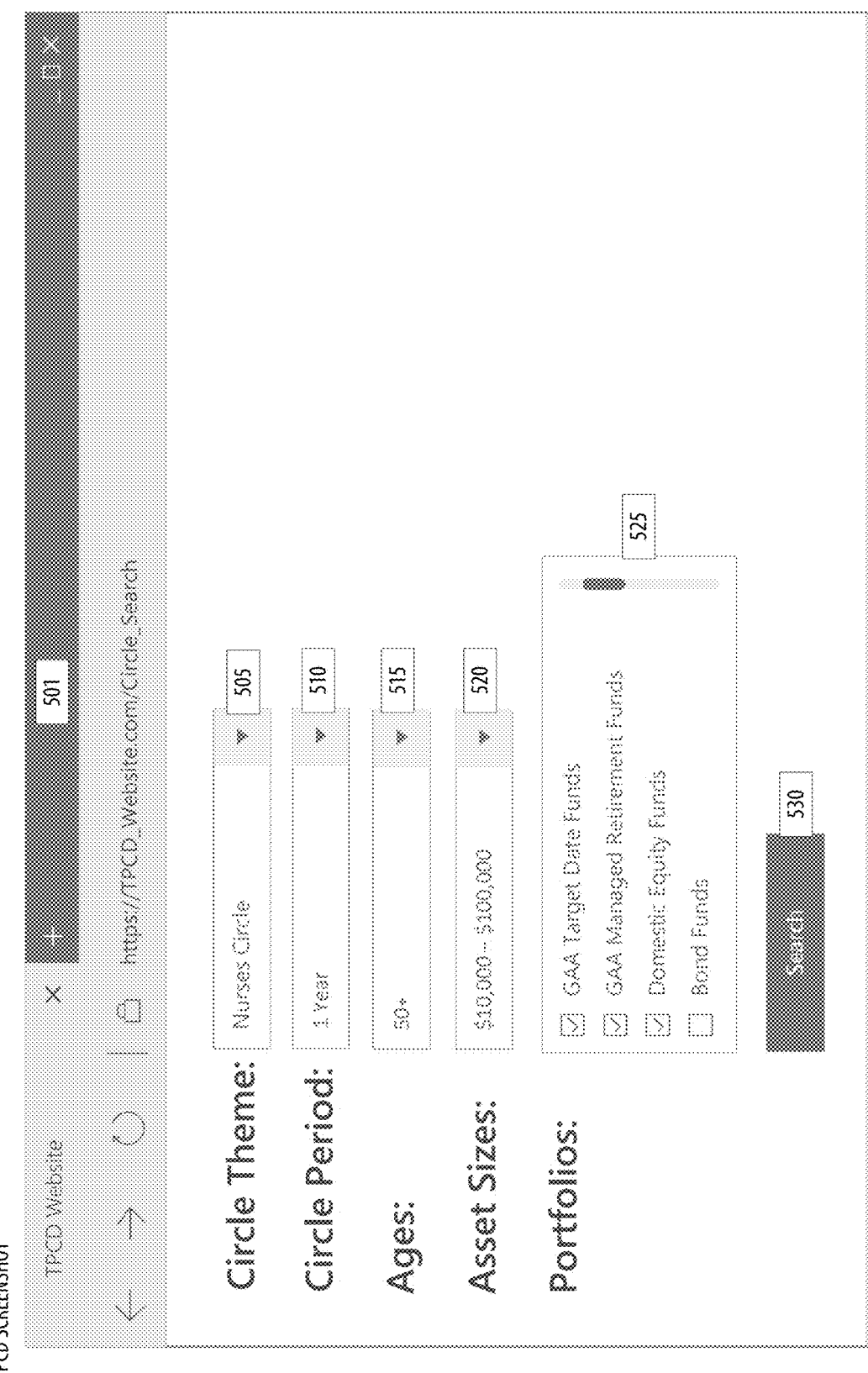
FIG. 5 shows non-limiting, example embodiments of a screenshot illustrating user interface(s) of the TPCD.

FIG. 5 shows non-limiting, example embodiments of a screenshot illustrating user interface(s) of the TPCD. In FIG. 5, an exemplary user interface (e.g., for a mobile device, for a website) for specifying TOP-RC user preferences to facilitate searching for matching TOP-RC templates (or objects) is illustrated. Screen 501 shows that a user may utilize a circle theme widget 505 to select a circle theme (e.g., nurses circle). The user may utilize a circle period widget 510 to select a circle period (e.g., 1 year). The user may utilize an ages widget 515 to select an age range (e.g., 50+ years). The user may utilize an asset sizes widget 520 to select an asset size range (e.g., portfolio to be used with a TOP-RC object having a size between $10,000 and $100,000). The user may utilize a portfolios widget 525 to select acceptable portfolio investments that may be used with a TOP-RC object (e.g., Global Asset Allocation (GAA) Target Date Funds, GAA Managed Retirement Funds, Domestic Equity Funds). The user may utilize a search widget 530 to initiate searching for matching TOP-RC templates (or objects).

Figure 6A:
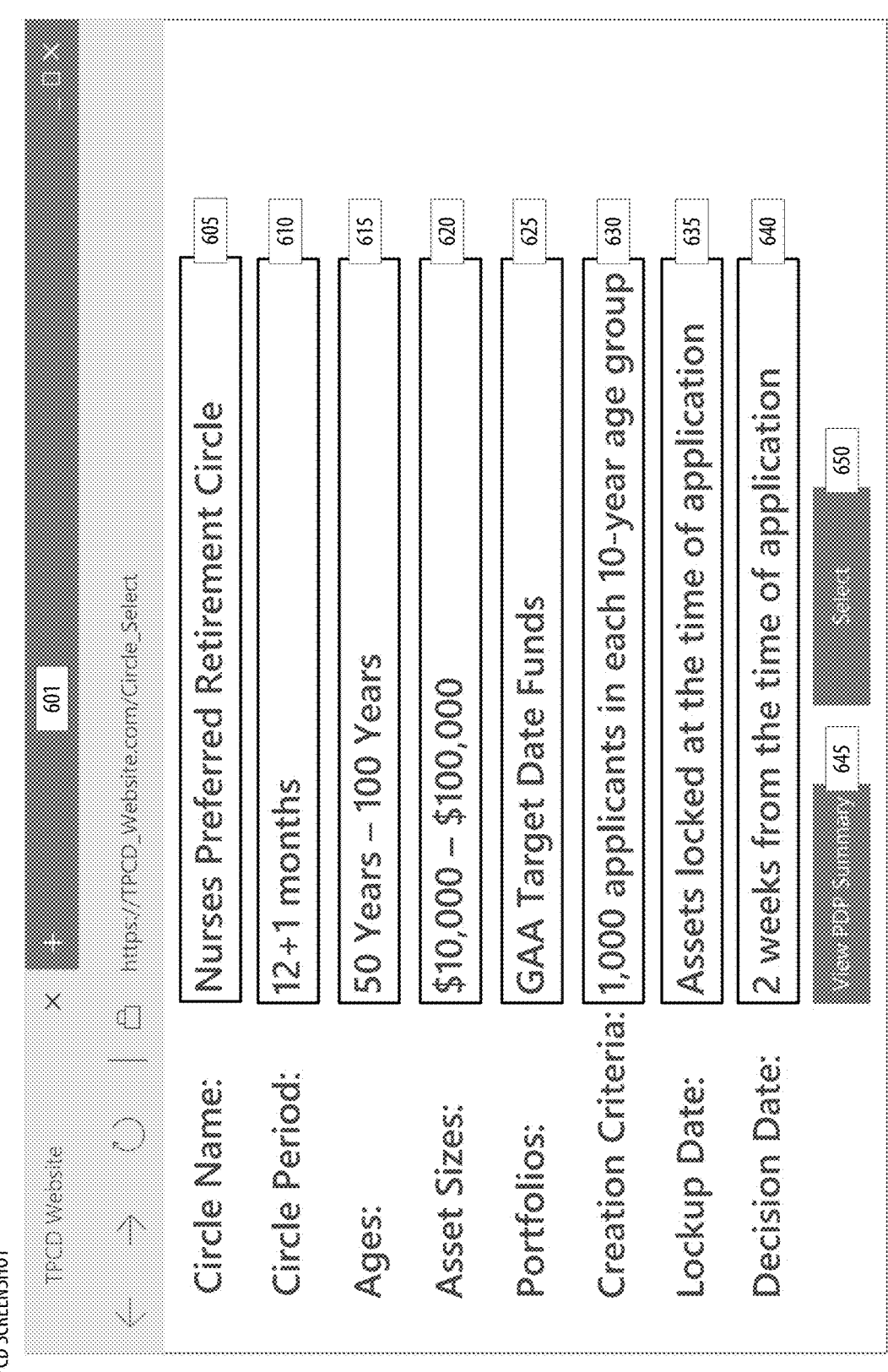
FIGS. 6A-B show non-limiting, example embodiments of a screenshot illustrating user interface(s) of the TPCD.
Figure 6B:
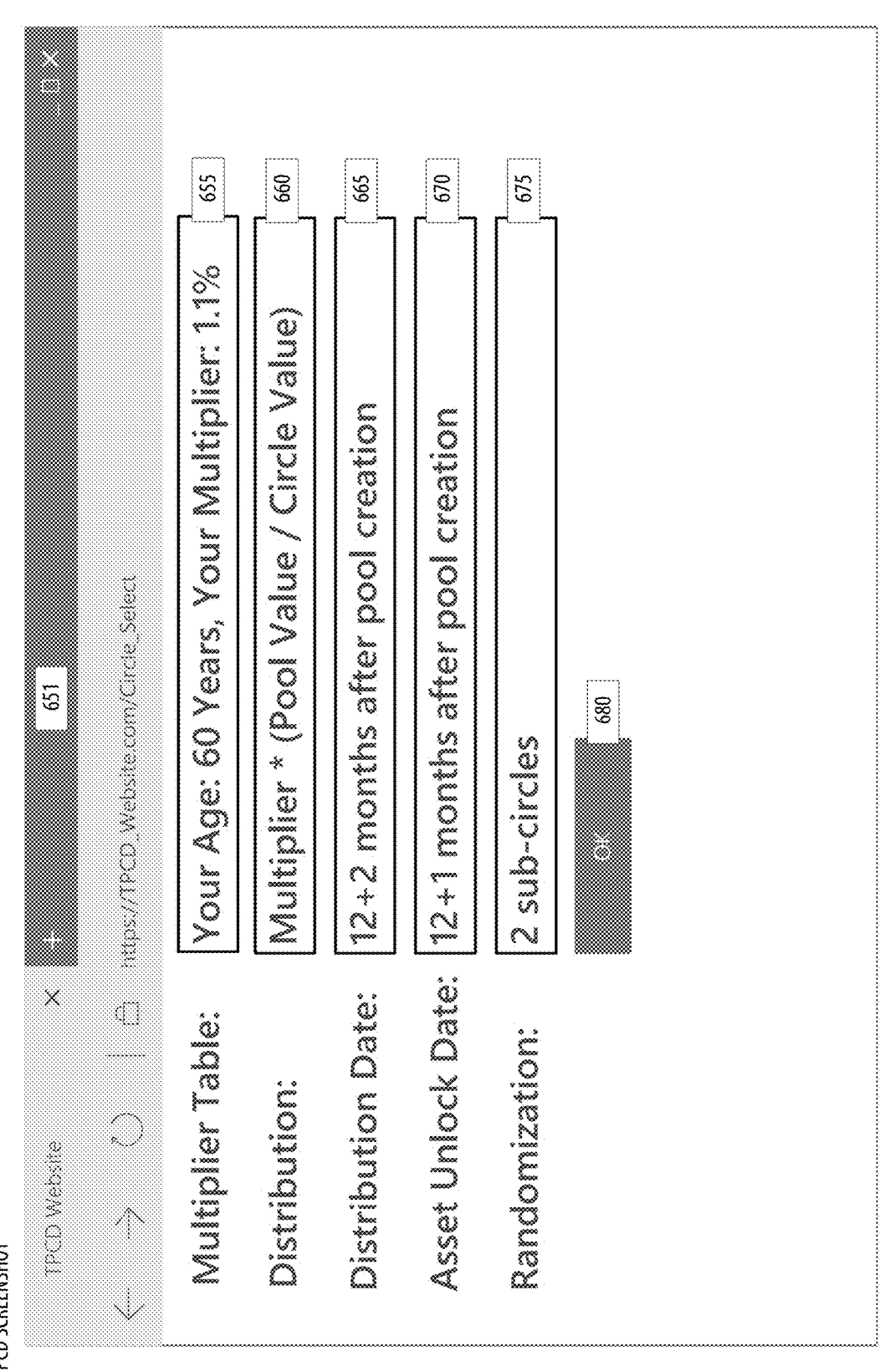

FIGS. 6A-B show non-limiting, example embodiments of a screenshot illustrating user interface(s) of the TPCD. In FIG. 6A, an exemplary user interface (e.g., for a mobile device, for a website) for displaying summary information provided in a CCM summary object for a matching TOP-RC template (or object) is illustrated. Screen 601 shows that a user may utilize a circle name widget 605 to view the circle name (e.g., Nurses Preferred Retirement Circle). The user may utilize a circle period widget 610 to view the circle period (e.g., 12+1 month (e.g., 12 months lockup period and 1 month to ascertain mortality status and unlock portfolio investments)). The user may utilize an ages widget 615 to view the acceptable age range for the circle (e.g., 50 years-100 years). The user may utilize an asset sizes widget 620 to view the acceptable asset sizes for the circle (e.g., between $10,000 and $100,000). The user may utilize a portfolios widget 625 to view the acceptable portfolio investments for the circle (e.g., GAA Target Date Funds). The user may utilize a creation criteria widget 630 to view the creation criteria for the circle (e.g., at least 1,000 applicants in each 10-year age group). The user may utilize a lockup date widget 635 to view the asset lockup date for the circle (e.g., assets are locked at the time of application). The user may utilize a decision date widget 640 to view the decision date for the circle (e.g., the user will be informed whether the user was accepted into the circle 2 weeks from the time of application). The user may utilize a view PDP summary widget 645 to view the summary information provided in a PDP summary object for the matching TOP-RC template (or object) shown in FIG. 6B. The user may utilize a select widget 650 to apply to join the TOP-RC corresponding to the matching TOP-RC template (or object).

In FIG. 6B, an exemplary user interface (e.g., for a mobile device, for a website) for displaying summary information provided in a PDP summary object for the matching TOP-RC template (or object) is illustrated. Screen 651 shows that the user may utilize a multiplier table widget 655 to view the multiplier for the circle (e.g., 1.1% for the user's age (e.g., 60 years)). The user may utilize a distribution widget 660 to view the distribution size formula for the circle (e.g., Multiplier*(Pool Value/Circle Value)). The user may utilize a distribution date widget 665 to view the circle distribution date (e.g., 12+1 month after pool creation). The user may utilize an asset unlock date widget 670 to view the circle asset unlock date (e.g., 12+2 month after pool creation (e.g., to allow sufficient time for liquidation of pool assets)). The user may utilize a randomization widget 675 to view the number of sub-circles to be utilized for the circle (e.g., 2 sub-circles). The user may utilize an OK widget 680 to return to viewing the summary information provided in the CCM summary object for the matching TOP-RC template (or object) shown in FIG. 6A.

Figure 7:
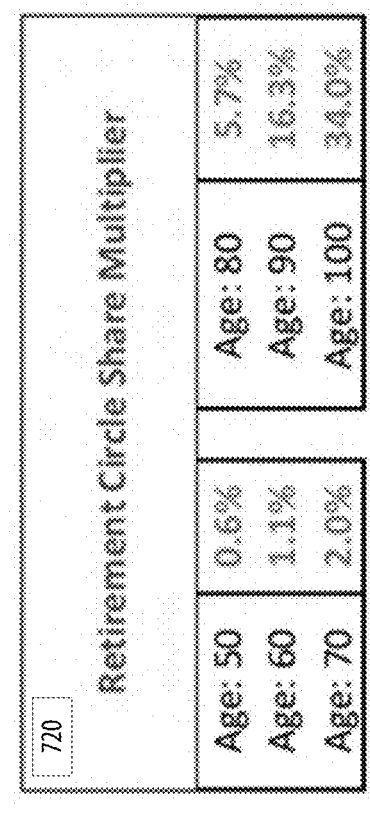
FIG. 7 shows non-limiting, example embodiments of implementation case(s) for the TPCD.
Figure 7:
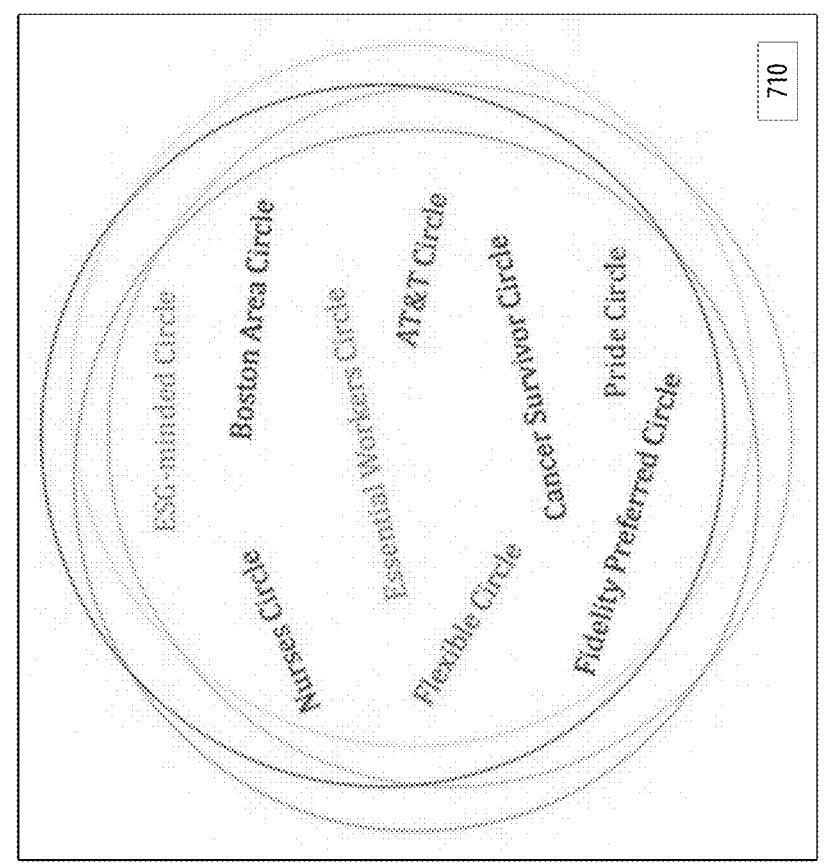

FIG. 7 shows non-limiting, example embodiments of implementation case(s) for the TPCD. In FIG. 7, a set of exemplary TOP-RC themes is illustrated at 710. For example, circle themes may include Nurses Circle, Boston Area Circle, Cancer Survivor Circle, and/or the like. An exemplary TOP-RC share multiplier table is illustrated at 720. For example, the circle share multiplier for a 60 year old male is 1.1%.

Figure 8:
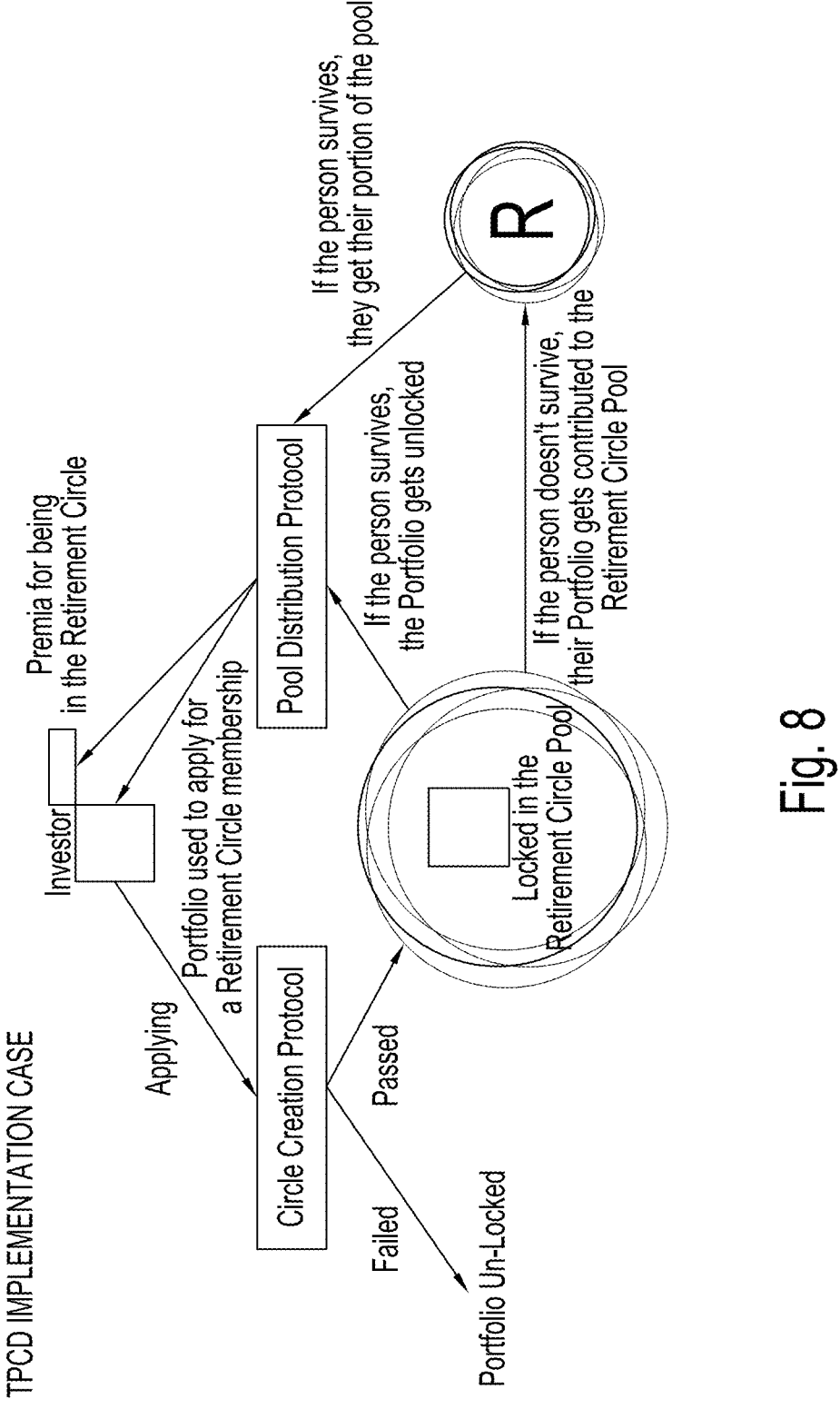
FIG. 8 shows non-limiting, example embodiments of implementation case(s) for the TPCD.

FIG. 8 shows non-limiting, example embodiments of implementation case(s) for the TPCD. In FIG. 8, an exemplary TPCD platform design is illustrated. As shown in FIG. 8, an investor may use a portfolio to apply for a TOP-RC membership. If creation criteria utilized by the circle creation protocol are not met, the investor's portfolio is unlocked. If creation criteria utilized by the circle creation protocol are met, the investor's portfolio is locked in the TOP-RC pool during the circle period. If the investor does not survive, the investor's portfolio is contributed to the TOP-RC pool. If the investor survives, the investor's portfolio is unlocked and the investor gets a portion of the TOP-RC pool. Thus, a surviving investor gets back their portfolio and premia for being in the TOP-RC. The portfolio (e.g., including the premia) may be reinvested in another TOP-RC.

Figure 9:
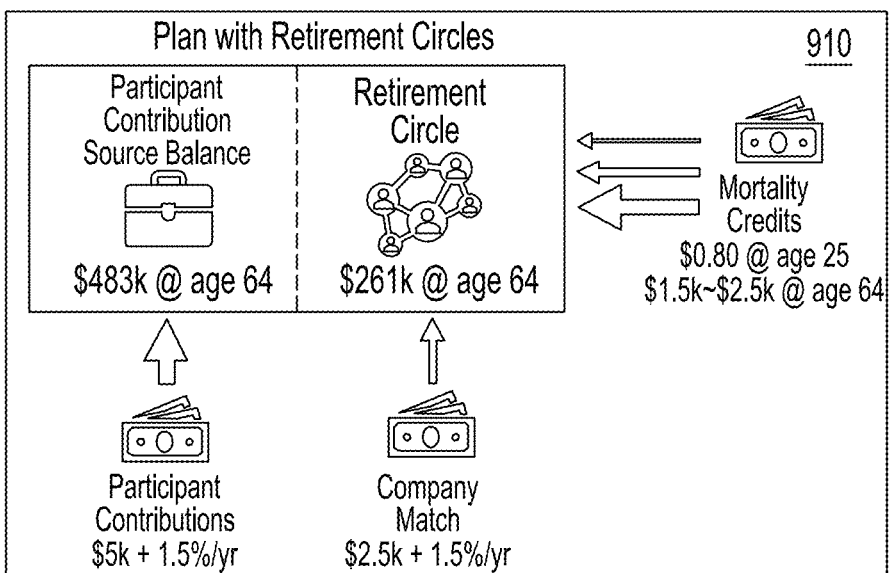
FIG. 9 shows non-limiting, example embodiments of implementation case(s) for the TPCD.
Figure 9:
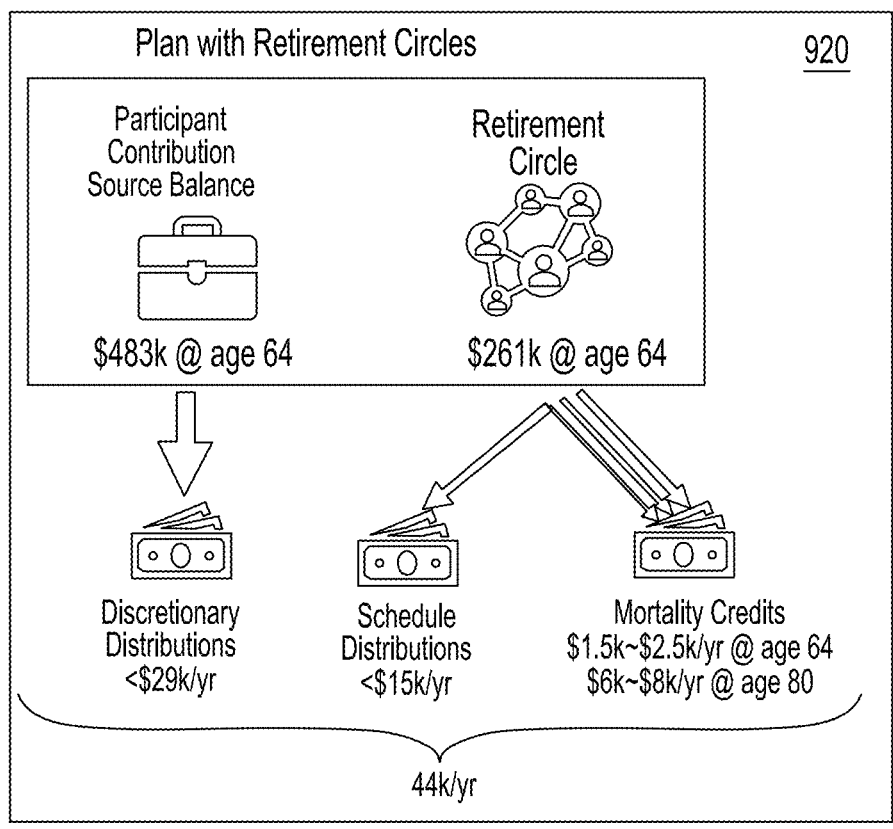

FIG. 9 shows non-limiting, example embodiments of implementation case(s) for the TPCD. In FIG. 9, an exemplary retirement plan that utilizes retirement circles is illustrated. Screen 910 shows that pre-retirement, the retirement plan may utilize participant contributions, which may be unlocked for participants, and a company match, which may be locked for participants in a TOP-RC. Screen 920 shows that post-retirement, the retirement plan may provide a participant with discretionary contributions (e.g., from the participant contributions), scheduled distributions (e.g., from the company match), and mortality credits (e.g., from TOP-RC pool distributions). In comparison to an implementation case that does not utilize a TOP-RC, in this implementation case, the company match provides increased income to participants post-retirement by reducing or eliminating legacy of participants attributable to the company match (e.g., so that the company match is used to support participants, which is the intended purpose of the retirement plan, instead of heirs).

Additional Alternative Embodiment Examples

The following alternative example embodiments provide a number of variations of some of the already discussed principles for expanded color on the abilities of the TPCD. Additional embodiments may include:

1. A thematic protocol and circle data structure generator apparatus, comprising: at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, a thematic circle join request datastructure, in which the thematic circle join request datastructure is structured to include a user object identifier, a portfolio object identifier associated with the user object identifier, and a thematic circle template identifier;

determine, via the at least one processor, a thematic circle object instantiated based on a thematic circle template corresponding to the thematic circle template identifier;

add, via the at least one processor, the user object identifier to a participants datastructure comprising participant user object identifiers associated with the thematic circle object;

mark, via the at least one processor, a portfolio object corresponding to the portfolio object identifier as locked;

evaluate, via the at least one processor, a set of creation criteria associated with the thematic circle object based on analysis of user objects corresponding to user object identifiers in the participants datastructure, in which the set of creation criteria is defined in the thematic circle template;

activate, via the at least one processor, the thematic circle object based on a determination that the set of creation criteria has been met, in which the instructions to activate the thematic circle object are structured to include instructions to start a circle period timer on an activation date associated with the thematic circle object; and initiate, via the at least one processor, a pool distribution protocol associated with the thematic circle object upon expiration of the circle period timer, in which the pool distribution protocol is defined in the thematic circle template.

2. The apparatus of embodiment 1, in which the thematic circle join request datastructure is structured to include a set of thematic circle characteristics, and in which the thematic circle object is determined also based on the set of thematic circle characteristics.

3. The apparatus of embodiment 2, in which the set of thematic circle characteristics is obtained via a user interface configured to obtain input from a user.

4. The apparatus of embodiment 1, in which the component collection storage is further structured with processor-executable instructions, comprising:

determine, via the at least one processor, that a thematic circle object based on the thematic circle template corresponding to the thematic circle template identifier has not been previously instantiated; and instantiate, via the at least one processor, the thematic circle object, in which the instructions to instantiate the thematic circle object are structured to include instructions to set a creation decision date for the thematic circle object, and in which the instructions to evaluate the set of creation criteria are structured to include instructions to perform the evaluation after reaching the creation decision date.

5. The apparatus of embodiment 1, in which the component collection storage is further structured with processor-executable instructions, comprising:

determine, via the at least one processor, a set of user groups associated with the thematic circle object;

determine, via the at least one processor, a set of user grouping characteristics associated with a user object corresponding to the user object identifier;

determine, via the at least one processor, a matching user group, from the set of user groups, based on evaluation of the set of user grouping characteristics; and in which the instructions to add the user object identifier to the participants datastructure are structured to include instructions to associate the user object identifier with the matching user group.

6. The apparatus of embodiment 5, in which the set of user groups is a set of age groups.

7. The apparatus of embodiment 1, in which the thematic circle join request datastructure is structured to include a set of investment object identifiers associated with the portfolio object identifier; and in which the instructions to mark the portfolio object corresponding to the portfolio object identifier as locked are structured to include instructions to mark investment objects corresponding to the set of investment object identifiers as locked.

8. The apparatus of embodiment 1, in which assets associated with the portfolio object marked as locked can be traded but cannot be withdrawn by a user corresponding to the user object identifier.

9. The apparatus of embodiment 1, in which the set of creation criteria includes specifications for a set of metrics that include at least one of: number of applicants, applicant asset ratio deviation, applicant portfolio return ratio deviation.

10. The apparatus of embodiment 1, in which the instructions to initiate the pool distribution protocol associated with the thematic circle object are structured as instructions to generate a pool distribution request function call.

11. The apparatus of embodiment 10, in which the component collection storage is further structured with processor-executable instructions, comprising:

obtain, via the at least one processor, the pool distribution request function call associated with the thematic circle object;

determine, via the at least one processor, a user mortality status for each user object identifier in the participants datastructure;

transfer, via the at least one processor, for each user object identifier with non-surviving user mortality status, a portfolio object associated with the respective user object identifier to a pool object associated with the thematic circle object;

mark, via the at least one processor, the portfolio object corresponding to the portfolio object identifier as unlocked;

calculate, via the at least one processor, a pool distribution value for a user object corresponding to the user object identifier, in which the user object identifier has surviving user mortality status;

determine, via the at least one processor, a pool distribution allocation for the user object; and generate, via the at least one processor, a pool distribution notification that includes a set of allocation actions that facilitate transferring the pool distribution allocation to the portfolio object corresponding to the portfolio object identifier.

12. The apparatus of embodiment 11, in which the instructions to determine a user mortality status for a user object identifier are structured as instructions to query a mortality status oracle server.

13. The apparatus of embodiment 11, in which the instructions to determine a user mortality status for a user object identifier are structured as instructions to evaluate a smart contract stored on a blockchain.

14. The apparatus of embodiment 11, in which the instructions to calculate the pool distribution value for the user object corresponding to the user object identifier are structured to include instructions to determine a thematic circle share multiplier associated with the user object.

15. The apparatus of embodiment 11, in which the instructions to determine the pool distribution allocation for the user object are structured to include instructions to determine a pool distribution type for the user object.

16. A thematic protocol and circle data structure generator processor-readable, non-transient medium, the medium storing a component collection, the component collection storage structured with processor-executable instructions comprising:

obtain, via the at least one processor, a thematic circle join request datastructure, in which the thematic circle join request datastructure is structured to include a user object identifier, a portfolio object identifier associated with the user object identifier, and a thematic circle template identifier;

determine, via the at least one processor, a thematic circle object instantiated based on a thematic circle template corresponding to the thematic circle template identifier;

add, via the at least one processor, the user object identifier to a participants datastructure comprising participant user object identifiers associated with the thematic circle object;

mark, via the at least one processor, a portfolio object corresponding to the portfolio object identifier as locked;

evaluate, via the at least one processor, a set of creation criteria associated with the thematic circle object based on analysis of user objects corresponding to user object identifiers in the participants datastructure, in which the set of creation criteria is defined in the thematic circle template;

activate, via the at least one processor, the thematic circle object based on a determination that the set of creation criteria has been met, in which the instructions to activate the thematic circle object are structured to include instructions to start a circle period timer on an activation date associated with the thematic circle object; and initiate, via the at least one processor, a pool distribution protocol associated with the thematic circle object upon expiration of the circle period timer, in which the pool distribution protocol is defined in the thematic circle template.

17. The medium of embodiment 16, in which the thematic circle join request datastructure is structured to include a set of thematic circle characteristics, and in which the thematic circle object is determined also based on the set of thematic circle characteristics.

18. The medium of embodiment 17, in which the set of thematic circle characteristics is obtained via a user interface configured to obtain input from a user.

19. The medium of embodiment 16, in which the component collection storage is further structured with processor-executable instructions, comprising:

determine, via the at least one processor, that a thematic circle object based on the thematic circle template corresponding to the thematic circle template identifier has not been previously instantiated; and instantiate, via the at least one processor, the thematic circle object, in which the instructions to instantiate the thematic circle object are structured to include instructions to set a creation decision date for the thematic circle object, and in which the instructions to evaluate the set of creation criteria are structured to include instructions to perform the evaluation after reaching the creation decision date.

20. The medium of embodiment 16, in which the component collection storage is further structured with processor-executable instructions, comprising:

determine, via the at least one processor, a set of user groups associated with the thematic circle object;

determine, via the at least one processor, a set of user grouping characteristics associated with a user object corresponding to the user object identifier;

determine, via the at least one processor, a matching user group, from the set of user groups, based on evaluation of the set of user grouping characteristics; and in which the instructions to add the user object identifier to the participants datastructure are structured to include instructions to associate the user object identifier with the matching user group.

21. The medium of embodiment 20, in which the set of user groups is a set of age groups.

22. The medium of embodiment 16, in which the thematic circle join request datastructure is structured to include a set of investment object identifiers associated with the portfolio object identifier; and in which the instructions to mark the portfolio object corresponding to the portfolio object identifier as locked are structured to include instructions to mark investment objects corresponding to the set of investment object identifiers as locked.

23. The medium of embodiment 16, in which assets associated with the portfolio object marked as locked can be traded but cannot be withdrawn by a user corresponding to the user object identifier.

24. The medium of embodiment 16, in which the set of creation criteria includes specifications for a set of metrics that include at least one of: number of applicants, applicant asset ratio deviation, applicant portfolio return ratio deviation.

25. The medium of embodiment 16, in which the instructions to initiate the pool distribution protocol associated with the thematic circle object are structured as instructions to generate a pool distribution request function call.

26. The medium of embodiment 25, in which the component collection storage is further structured with processor-executable instructions, comprising:

obtain, via the at least one processor, the pool distribution request function call associated with the thematic circle object;

determine, via the at least one processor, a user mortality status for each user object identifier in the participants datastructure;

transfer, via the at least one processor, for each user object identifier with non-surviving user mortality status, a portfolio object associated with the respective user object identifier to a pool object associated with the thematic circle object;

mark, via the at least one processor, the portfolio object corresponding to the portfolio object identifier as unlocked;

calculate, via the at least one processor, a pool distribution value for a user object corresponding to the user object identifier, in which the user object identifier has surviving user mortality status;

determine, via the at least one processor, a pool distribution allocation for the user object; and generate, via the at least one processor, a pool distribution notification that includes a set of allocation actions that facilitate transferring the pool distribution allocation to the portfolio object corresponding to the portfolio object identifier.

27. The medium of embodiment 26, in which the instructions to determine a user mortality status for a user object identifier are structured as instructions to query a mortality status oracle server.

28. The medium of embodiment 26, in which the instructions to determine a user mortality status for a user object identifier are structured as instructions to evaluate a smart contract stored on a blockchain.

29. The medium of embodiment 26, in which the instructions to calculate the pool distribution value for the user object corresponding to the user object identifier are structured to include instructions to determine a thematic circle share multiplier associated with the user object.

30. The medium of embodiment 26, in which the instructions to determine the pool distribution allocation for the user object are structured to include instructions to determine a pool distribution type for the user object.

31. A thematic protocol and circle data structure generator processor-implemented system, comprising:

means to store a component collection;

means to process processor-executable instructions from the component collection, the component collection storage structured with processor-executable instructions including:

obtain, via the at least one processor, a thematic circle join request datastructure, in which the thematic circle join request datastructure is structured to include a user object identifier, a portfolio object identifier associated with the user object identifier, and a thematic circle template identifier;

determine, via the at least one processor, a thematic circle object instantiated based on a thematic circle template corresponding to the thematic circle template identifier;

add, via the at least one processor, the user object identifier to a participants datastructure comprising participant user object identifiers associated with the thematic circle object;

mark, via the at least one processor, a portfolio object corresponding to the portfolio object identifier as locked;

evaluate, via the at least one processor, a set of creation criteria associated with the thematic circle object based on analysis of user objects corresponding to user object identifiers in the participants datastructure, in which the set of creation criteria is defined in the thematic circle template;

activate, via the at least one processor, the thematic circle object based on a determination that the set of creation criteria has been met, in which the instructions to activate the thematic circle object are structured to include instructions to start a circle period timer on an activation date associated with the thematic circle object; and initiate, via the at least one processor, a pool distribution protocol associated with the thematic circle object upon expiration of the circle period timer, in which the pool distribution protocol is defined in the thematic circle template.

32. The system of embodiment 31, in which the thematic circle join request datastructure is structured to include a set of thematic circle characteristics, and in which the thematic circle object is determined also based on the set of thematic circle characteristics.

33. The system of embodiment 32, in which the set of thematic circle characteristics is obtained via a user interface configured to obtain input from a user.

34. The system of embodiment 31, in which the component collection storage is further structured with processor-executable instructions, comprising:

determine, via the at least one processor, that a thematic circle object based on the thematic circle template corresponding to the thematic circle template identifier has not been previously instantiated; and instantiate, via the at least one processor, the thematic circle object, in which the instructions to instantiate the thematic circle object are structured to include instructions to set a creation decision date for the thematic circle object, and in which the instructions to evaluate the set of creation criteria are structured to include instructions to perform the evaluation after reaching the creation decision date.

35. The system of embodiment 31, in which the component collection storage is further structured with processor-executable instructions, comprising:

determine, via the at least one processor, a set of user groups associated with the thematic circle object;

determine, via the at least one processor, a set of user grouping characteristics associated with a user object corresponding to the user object identifier;

determine, via the at least one processor, a matching user group, from the set of user groups, based on evaluation of the set of user grouping characteristics; and in which the instructions to add the user object identifier to the participants datastructure are structured to include instructions to associate the user object identifier with the matching user group.

36. The system of embodiment 35, in which the set of user groups is a set of age groups.

37. The system of embodiment 31, in which the thematic circle join request datastructure is structured to include a set of investment object identifiers associated with the portfolio object identifier; and in which the instructions to mark the portfolio object corresponding to the portfolio object identifier as locked are structured to include instructions to mark investment objects corresponding to the set of investment object identifiers as locked.

38. The system of embodiment 31, in which assets associated with the portfolio object marked as locked can be traded but cannot be withdrawn by a user corresponding to the user object identifier.

39. The system of embodiment 31, in which the set of creation criteria includes specifications for a set of metrics that include at least one of: number of applicants, applicant asset ratio deviation, applicant portfolio return ratio deviation.

40. The system of embodiment 31, in which the instructions to initiate the pool distribution protocol associated with the thematic circle object are structured as instructions to generate a pool distribution request function call.

41. The system of embodiment 40, in which the component collection storage is further structured with processor-executable instructions, comprising:

obtain, via the at least one processor, the pool distribution request function call associated with the thematic circle object;

determine, via the at least one processor, a user mortality status for each user object identifier in the participants datastructure;

transfer, via the at least one processor, for each user object identifier with non-surviving user mortality status, a portfolio object associated with the respective user object identifier to a pool object associated with the thematic circle object;

mark, via the at least one processor, the portfolio object corresponding to the portfolio object identifier as unlocked;

calculate, via the at least one processor, a pool distribution value for a user object corresponding to the user object identifier, in which the user object identifier has surviving user mortality status;

determine, via the at least one processor, a pool distribution allocation for the user object; and generate, via the at least one processor, a pool distribution notification that includes a set of allocation actions that facilitate transferring the pool distribution allocation to the portfolio object corresponding to the portfolio object identifier.

42. The system of embodiment 41, in which the instructions to determine a user mortality status for a user object identifier are structured as instructions to query a mortality status oracle server.

43. The system of embodiment 41, in which the instructions to determine a user mortality status for a user object identifier are structured as instructions to evaluate a smart contract stored on a blockchain.

44. The system of embodiment 41, in which the instructions to calculate the pool distribution value for the user object corresponding to the user object identifier are structured to include instructions to determine a thematic circle share multiplier associated with the user object.

45. The system of embodiment 41, in which the instructions to determine the pool distribution allocation for the user object are structured to include instructions to determine a pool distribution type for the user object.

46. A thematic protocol and circle data structure generator processor-implemented process, including processing processor-executable instructions via at least one processor from a component collection stored in at least one memory, the component collection storage structured with processor-executable instructions comprising:

obtain, via the at least one processor, a thematic circle join request datastructure, in which the thematic circle join request datastructure is structured to include a user object identifier, a portfolio object identifier associated with the user object identifier, and a thematic circle template identifier;

determine, via the at least one processor, a thematic circle object instantiated based on a thematic circle template corresponding to the thematic circle template identifier;

add, via the at least one processor, the user object identifier to a participants datastructure comprising participant user object identifiers associated with the thematic circle object;

mark, via the at least one processor, a portfolio object corresponding to the portfolio object identifier as locked;

evaluate, via the at least one processor, a set of creation criteria associated with the thematic circle object based on analysis of user objects corresponding to user object identifiers in the participants datastructure, in which the set of creation criteria is defined in the thematic circle template;

activate, via the at least one processor, the thematic circle object based on a determination that the set of creation criteria has been met, in which the instructions to activate the thematic circle object are structured to include instructions to start a circle period timer on an activation date associated with the thematic circle object; and initiate, via the at least one processor, a pool distribution protocol associated with the thematic circle object upon expiration of the circle period timer, in which the pool distribution protocol is defined in the thematic circle template.

47. The process of embodiment 46, in which the thematic circle join request datastructure is structured to include a set of thematic circle characteristics, and in which the thematic circle object is determined also based on the set of thematic circle characteristics.

48. The process of embodiment 47, in which the set of thematic circle characteristics is obtained via a user interface configured to obtain input from a user.

49. The process of embodiment 46, in which the component collection storage is further structured with processor-executable instructions, comprising:

determine, via the at least one processor, that a thematic circle object based on the thematic circle template corresponding to the thematic circle template identifier has not been previously instantiated; and instantiate, via the at least one processor, the thematic circle object, in which the instructions to instantiate the thematic circle object are structured to include instructions to set a creation decision date for the thematic circle object, and in which the instructions to evaluate the set of creation criteria are structured to include instructions to perform the evaluation after reaching the creation decision date.

50. The process of embodiment 46, in which the component collection storage is further structured with processor-executable instructions, comprising:

determine, via the at least one processor, a set of user groups associated with the thematic circle object;

determine, via the at least one processor, a set of user grouping characteristics associated with a user object corresponding to the user object identifier;

determine, via the at least one processor, a matching user group, from the set of user groups, based on evaluation of the set of user grouping characteristics; and in which the instructions to add the user object identifier to the participants datastructure are structured to include instructions to associate the user object identifier with the matching user group.

51. The process of embodiment 50, in which the set of user groups is a set of age groups.

52. The process of embodiment 46, in which the thematic circle join request datastructure is structured to include a set of investment object identifiers associated with the portfolio object identifier; and in which the instructions to mark the portfolio object corresponding to the portfolio object identifier as locked are structured to include instructions to mark investment objects corresponding to the set of investment object identifiers as locked.

53. The process of embodiment 46, in which assets associated with the portfolio object marked as locked can be traded but cannot be withdrawn by a user corresponding to the user object identifier.

54. The process of embodiment 46, in which the set of creation criteria includes specifications for a set of metrics that include at least one of: number of applicants, applicant asset ratio deviation, applicant portfolio return ratio deviation.

55. The process of embodiment 46, in which the instructions to initiate the pool distribution protocol associated with the thematic circle object are structured as instructions to generate a pool distribution request function call.

56. The process of embodiment 55, in which the component collection storage is further structured with processor-executable instructions, comprising:

obtain, via the at least one processor, the pool distribution request function call associated with the thematic circle object;

determine, via the at least one processor, a user mortality status for each user object identifier in the participants datastructure;

transfer, via the at least one processor, for each user object identifier with non-surviving user mortality status, a portfolio object associated with the respective user object identifier to a pool object associated with the thematic circle object;

mark, via the at least one processor, the portfolio object corresponding to the portfolio object identifier as unlocked;

calculate, via the at least one processor, a pool distribution value for a user object corresponding to the user object identifier, in which the user object identifier has surviving user mortality status;

determine, via the at least one processor, a pool distribution allocation for the user object; and generate, via the at least one processor, a pool distribution notification that includes a set of allocation actions that facilitate transferring the pool distribution allocation to the portfolio object corresponding to the portfolio object identifier.

57. The process of embodiment 56, in which the instructions to determine a user mortality status for a user object identifier are structured as instructions to query a mortality status oracle server.

58. The process of embodiment 56, in which the instructions to determine a user mortality status for a user object identifier are structured as instructions to evaluate a smart contract stored on a blockchain.

59. The process of embodiment 56, in which the instructions to calculate the pool distribution value for the user object corresponding to the user object identifier are structured to include instructions to determine a thematic circle share multiplier associated with the user object.

60. The process of embodiment 56, in which the instructions to determine the pool distribution allocation for the user object are structured to include instructions to determine a pool distribution type for the user object.

TPCD Controller

Figure 10:
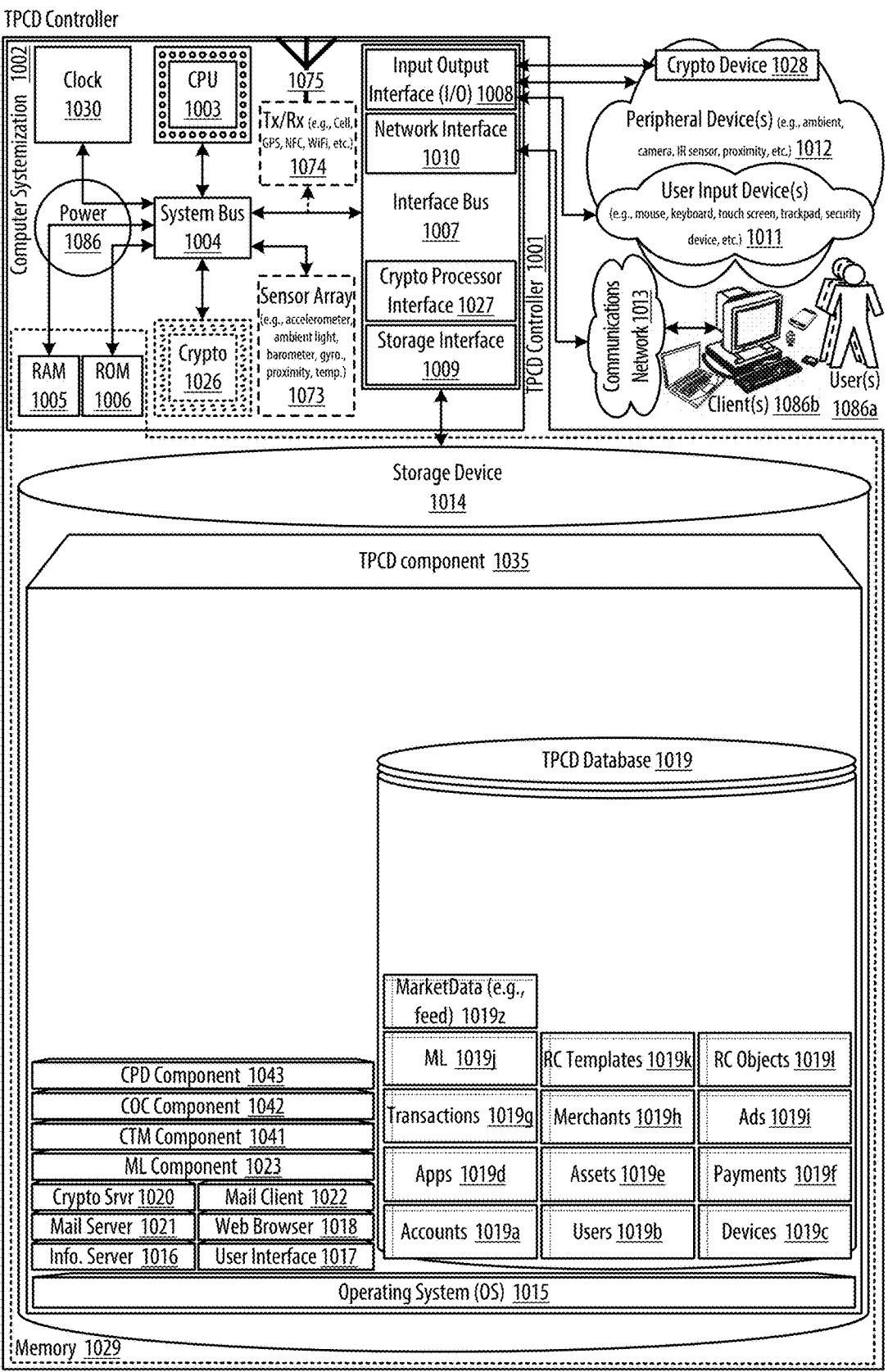
FIG. 10 shows a block diagram illustrating non-limiting, example embodiments of a TPCD controller.

FIG. 10 shows a block diagram illustrating non-limiting, example embodiments of a TPCD controller. In this embodiment, the TPCD controller 1001 may serve to aggregate, process, store, search, serve, identify, instruct, generate, match, and/or facilitate interactions with a computer through information technology technologies, and/or other related data.

Users, which may be people and/or other systems, may engage information technology systems (e.g., computers) to facilitate information processing. In turn, computers employ processors to process information; such processors 1003 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 1029 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the TPCD controller 1001 may be connected to and/or communicate with entities such as, but not limited to: one or more users from peripheral devices 1012 (e.g., user input devices 1011); an optional cryptographic processor device 1028; and/or a communications network 1013.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The TPCD controller 1001 may be based on computer systems that may comprise, but are not limited to, components such as: a computer systemization 1002 connected to memory 1029.

Computer Systemization

A computer systemization 1002 may comprise a clock 1030, central processing unit ("CPU(s)" and/or "processor (s)" (these terms are used interchangeably throughout the disclosure unless noted to the contrary)) 1003, a memory 1029 (e.g., a read only memory (ROM) 1006, a random access memory (RAM) 1005, etc.), and/or an interface bus 1007, and most frequently, although not necessarily, are all interconnected and/or communicating through a system bus 1004 on one or more (mother)board(s) 1002 having conductive and/or otherwise transportive circuit pathways through which instructions (e.g., binary encoded signals) may travel to effectuate communications, operations, storage, etc. The computer systemization may be connected to a power source 1086; e.g., optionally the power source may be internal. Optionally, a cryptographic processor 1026 may be connected to the system bus. In another embodiment, the cryptographic processor, transceivers (e.g., ICs) 1074, and/ or sensor array (e.g., accelerometer, altimeter, ambient light, barometer, global positioning system (GPS) (thereby allowing TPCD controller to determine its location), gyroscope, magnetometer, pedometer, proximity, ultra-violet sensor, etc.) 1073 may be connected as either internal and/or external peripheral devices 1012 via the interface bus I/O 1008 (not pictured) and/or directly via the interface bus 1007. In turn, the transceivers may be connected to antenna(s) 1075, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11g/, Bluetooth 4.0, near field communication (NFC), FM radio); an Infineon Technologies® X-Gold 618-PMB9800 transceiver chip (e.g., providing 2G/3G HSDPA/

HSUPA communications); a MediaTek® MT6620 transceiver chip (e.g., providing 802.11a/ac/b/g/n (also known as WiFi in numerous iterations), Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., headsets (e.g., Apple AirPods (Pro)®, glasses, goggles (e.g., Google Glass®), watches, etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1029 beyond the processor itself; internal memory may include, but is not limited to: fast registers, various levels of cache memory (e.g., level 1, 2, 3, etc.), (dynamic/static) RAM, solid state memory, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, i7, i9, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code), e.g., via load/read address commands; e.g., the CPU may read processor issuable instructions from memory (e.g., reading it from a component collection (e.g., an interpreted and/or compiled program application/library including allowing the processor to execute instructions from the application/library) stored in the memory). Such instruction passing facilitates communication within the TPCD controller and beyond through various interfaces. Should processing requirements dictate a greater amount speed and/or capacity, distributed processors (e.g., see Distributed TPCD below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the TPCD may be achieved by implementing a microcontroller such as CAST's® R8051XC2 microcontroller; Intel's® MCS 51 (i.e., 8051 microcontroller); and/or the like. Also, to implement certain features of the TPCD, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the TPCD component collection (distributed or otherwise) and/or features may be implemented via the microprocessor and/or via embedded components; e.g., via ASIC, coprocessor, DSP, FPGA, and/or the like. Alternately, some implementations of the TPCD may be implemented with embedded components that are configured and used to achieve a variety of features or signal processing.

Depending on the particular implementation, the embedded components may include software solutions, hardware solutions, and/or some combination of both hardware/software solutions. For example, TPCD features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the TPCD features. A hierarchy of programmable interconnects allow logic blocks to be interconnected as needed by the TPCD system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the TPCD may be developed on FPGAs and then migrated into a fixed version that more resembles ASIC implementations. Alternate or coordinating implementations may migrate TPCD controller features to a final ASIC instead of or in addition to FPGAs. Depending on the implementation all of the aforementioned embedded components and microprocessors may be considered the "CPU" and/or "processor" for the TPCD.

Power Source

The power source 1086 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1086 is connected to at least one of the interconnected subsequent components of the TPCD thereby providing an electric current to all subsequent components. In one example, the power source 1086 is connected to the system bus component 1004. In an alternative embodiment, an outside power source 1086 is provided through a connection across the I/O 1008 interface. For example, Ethernet (with power on Ethernet), IEEE 1394, USB and/or the like connections carry both data and power across the connection and is therefore a suitable source of power.

Interface Adapters

Interface bus(ses) 1007 may accept, connect, and/or communicate to a number of interface adapters, variously although not necessarily in the form of adapter cards, such as but not limited to: input output interfaces (I/O) 1008, storage interfaces 1009, network interfaces 1010, and/or the like. Optionally, cryptographic processor interfaces 1027 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1009 may accept, communicate, and/or connect to a number of storage devices such as, but not limited to: (removable) storage devices 1014, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Non-Volatile Memory (NVM) Express (NVMe), Small Computer Systems Interface (SCSI), Thunderbolt, Universal Serial Bus (USB), and/or the like.

Network interfaces 1010 may accept, communicate, and/or connect to a communications network 1013. Through a communications network 1013, the TPCD controller is accessible through remote clients 1033b (e.g., computers with web browsers) by users 1033a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed TPCD below), architectures may similarly be employed to pool, load balance, and/or otherwise decrease/increase the communicative bandwidth required by the TPCD controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1010 may be used to engage with various communications network types 1013. For example, multiple network interfaces may be employed to allow for the communication over broadcast, multicast, and/or unicast networks.

Input Output interfaces (I/O) 1008 may accept, communicate, and/or connect to user, peripheral devices 1012 (e.g., input devices 1011), cryptographic processor devices 1028, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, Thunderbolt/USB-C, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT), Liquid Crystal Display (LCD), Light-Emitting Diode (LED), Organic Light-Emitting Diode (OLED), and/or the like based monitor with an interface (e.g., HDMI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 1012 may be connected and/or communicate to I/O and/or other facilities of the like such as network interfaces, storage interfaces, directly to the interface bus, system bus, the CPU, and/or the like. Peripheral devices may be external, internal and/or part of the TPCD controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection ensuring secure transactions with a digital signature, as connection/format adaptors, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 1011 often are a type of peripheral device 512 (see above) and may include: accelerometers, cameras, card readers, dongles, finger print readers, gloves, graphics tablets, joysticks, keyboards, microphones, mouse (mice), remote controls, security/biometric devices (e.g., facial identifiers, fingerprint reader, iris reader, retina reader, etc.), styluses, touch screens (e.g., capacitive, resistive, etc.), trackballs, trackpads, watches, and/or the like.

It should be noted that although user input devices and peripheral devices may be employed, the TPCD controller may be embodied as an embedded, dedicated, and/or monitor-less (i.e., headless) device, and access may be provided over a network interface connection.

Cryptographic units such as, but not limited to, microcontrollers, processors 1026, interfaces 1027, and/or devices 1028 may be attached, and/or communicate with the TPCD controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNefs Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+ MB/s of cryptographic instructions; VLSI Technology's® 33 MHz 6868; and/or the like.

Memory

Generally, any mechanization and/or embodiment allowing a processor to affect the storage and/or retrieval of information is regarded as memory 1029. The storing of information in memory may result in a physical alteration of the memory to have a different physical state that makes the memory a structure with a unique encoding of the memory stored therein. Often, memory is a fungible technology and resource, thus, any number of memory embodiments may be employed in lieu of or in concert with one another. It is to be understood that the TPCD controller and/or a computer systemization may employ various forms of memory 1029. For example, a computer systemization may be configured to have the operation of on-chip CPU memory (e.g., registers), RAM, ROM, and any other storage devices performed by a paper punch tape or paper punch card mechanism; however, such an embodiment would result in an extremely slow rate of operation. In one configuration, memory 1029 will include ROM 1006, RAM 1005, and a storage device 1014. A storage device 1014 may be any various computer system storage. Storage devices may include: an array of devices (e.g., Redundant Array of Independent Disks (RAID)); a cache memory, a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; register memory (e.g., in a CPU), solid state memory devices (USB memory, solid state drives (SSD), etc.); other processor-readable storage mediums; and/or other devices of the like. Thus, a computer systemization generally employs and makes use of memory.

Component Collection

The memory 1029 may contain a collection of processor-executable application/library/program and/or database components (e.g., including processor-executable instructions) and/or data such as, but not limited to: operating system component(s) 1015 (operating system); information server component(s) 1016 (information server); user interface component(s) 1017 (user interface); Web browser component(s) 1018 (Web browser); database(s) 1019; mail server component(s) 1021; mail client component(s) 1022; cryptographic server component(s) 1020 (cryptographic server); machine learning component 1023; the TPCD component(s) 1035 (e.g., which may include CTM, COC, CPD 1041-1043, and/or the like components); and/or the like (i.e., collectively referred to throughout as a "component collection"). These components may be stored and accessed from the storage devices and/or from storage devices accessible through an interface bus. Although unconventional program components such as those in the component collection may be stored in a local storage device 1014, they may also be loaded and/or stored in memory such as: cache, peripheral devices, processor registers, RAM, remote storage facilities through a communications network, ROM, various forms of memory, and/or the like.

Operating System

The operating system component 1015 is an executable program component facilitating the operation of the TPCD controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millennium/Mobile/NT/Vista/XP/7/X (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may facilitate the interaction with communications networks, data, I/O, peripheral devices, program components, memory, user input devices, and/or the like. The operating system may provide communications protocols that allow the TPCD controller to communicate with other entities through a communications network 1013. Various communication protocols may be used by the TPCD controller as a subcarrier transport mechanism for interaction, such as, but not limited to: multicast, TCP/IP, UDP, unicast, and/or the like.

Information Server

An information server component 1016 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, Ruby, wireless application protocol (WAP), WebObjects®, and/or the like. The information server may support secure communications protocols such as, but not limited to, File Transfer Protocol (FTP(S)); HyperText Transfer Protocol (HTTP); Secure Hypertext Transfer Protocol (HTTPS), Secure Socket Layer (SSL) Transport Layer Security (TLS), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), Slack®, open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like). The information server may provide results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the TPCD controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the TPCD database 1019, operating systems, other program components, user interfaces, Web browsers, and/or the like.

Access to the TPCD database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the TPCD. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, and the resulting command is provided over the bridge mechanism to the TPCD as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, graphical views, menus, scrollers, text fields, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other webbrowser/cloud based client OSs); Microsoft's Windows® 2000/2003/3.1/95/98/CE/Millennium/Mobile/NT/Vista/XP/7/X (Server)® (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface®, and/or the like, any of which may be used and) provide a baseline and mechanism of accessing and displaying information graphically to users.

A user interface component 1017 is a stored program component that is executed by a CPU. The user interface may be a graphic user interface as provided by, with, and/or atop operating systems and/or operating environments, and may provide executable library APIs (as may operating systems and the numerous other components noted in the component collection) that allow instruction calls to generate user interface elements such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1018 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the TPCD enabled nodes. The combined application may be nugatory on systems employing Web browsers.

Mail Server

A mail server component 1021 is a stored program component that is executed by a CPU 1003. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the TPCD. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the TPCD mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1022 is a stored program component that is executed by a CPU 1003. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POPS, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1020 is a stored program component that is executed by a CPU 1003, cryptographic processor 1026, cryptographic processor interface 1027, cryptographic processor device 1028, and/or the like. Cryptographic processor interfaces will allow for expedition of encryption and/or decryption requests by the cryptographic component; however, the cryptographic component, alternatively, may run on a CPU and/or GPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component facilitates numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the TPCD may encrypt all incoming and/or outgoing communications and may serve as node within a virtual private network (VPN) with a wider communications network. The cryptographic component facilitates the process of "security authorization" whereby access to a resource is inhibited by a security protocol and the cryptographic component effects authorized access to the secured resource. In addition, the cryptographic component may provide unique identifiers of content, e.g., employing an MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the TPCD component to engage in secure transactions if so desired. The cryptographic component facilitates the secure accessing of resources on the TPCD and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

Machine Learning (ML)

A machine learning component 1023 is a stored program component that is executed by a CPU 1003. The machine learning component, alternatively, may run on a set of specialized processors, ASICs, FPGAs, GPUs, and/or the like. The machine learning component may run in a parallel and/or distributed way, such as by utilizing cloud computing. The machine learning component may employ an ML platform such as Amazon SageMaker, Azure Machine Learning, Google AI Platform, IBM Watson® Studio, DataRobot AI Cloud, and/or the like. The machine learning component may be implemented using an ML framework such as TensorFlow, PyTorch, Apache MXNet, MathWorks Deep Learning Toolbox, scikit-learn, XGBoost, and/or the like. The machine learning component facilitates training and/or testing of ML prediction logic data structures (e.g., models) and/or utilizing ML prediction logic data structures (e.g., models) to output ML predictions by the TPCD. The machine learning component may employ learning techniques such as Supervised Learning, Unsupervised Learning, Reinforcement Learning, and/or the like. The machine learning component may utilize ML prediction logic data structure (e.g., model) types such as Neural Networks (NNs), Decision Trees, Bayesian Networks, Regression prediction logic data structures (e.g., models), Classification prediction logic data structures (e.g., models), and/or the like.

The TPCD Database

The TPCD database component 1019 may be embodied in a database and its stored data. The database is a stored program component, which is executed by the CPU; the stored program component portion configuring the CPU to process the stored data. The database may be a fault tolerant, relational, scalable, secure database such as Claris FileMaker®, MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases include a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the TPCD database may be implemented using various other data-structures, such as an array, hash, (linked) list, struct, structured text file (e.g., XML), table, flat file database, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the TPCD database is implemented as a data-structure, the use of the TPCD database 1019 may be integrated into another component such as the TPCD component 1035. Also, the database may be implemented as a mix of data structures, objects, programs, relational structures, scripts, and/or the like. Databases may be consolidated and/or distributed in countless variations (e.g., see Distributed TPCD below). Portions of databases, e.g., tables, may be exported and/or imported and thus decentralized and/or integrated.

In one embodiment, the database component 1019 includes several tables representative of the schema, tables, structures, keys, entities and relationships of the described database 1019a-z:

An accounts table 1019a includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZlPcode, accountCountry, accountEmail, accountPhone, accountAuthKey, accountlPaddress, accountURLAccessCode, accountPortNo, accountAuthorizationCode, accountAcces sPrivileges, accountPreferences, accoun tRestrictions, and/or the like;

A users table 1019b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZlPCode, userCountry, userAuthorizationCode, userAccessPrivilges, userPreferences, userRestrictions, and/or the like (the user table may support and/or track multiple entity accounts on a TPCD);

An devices table 1019c includes fields such as, but not limited to: deviceID, sensorIDs, accountID, assetIDs, paymentIDs, deviceType, deviceName, deviceManufacturer, deviceModel, deviceVersion, deviceSerialNo, devicelPaddress, deviceMACaddress, device_ECID, deviceUUID, deviceLocation, deviceCertificate, deviceOS, appIDs, deviceResources, deviceSes sion, authKey, deviceSecureKey, walletAppInstalledFlag, deviceAcces sPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 1019d includes fields such as, but not limited to: appID, appName, appType, appDependencies, accountID, deviceIDs, transactionID, userID, appStoreAuthKey, appStoreAccountID, appStorelPaddress, appStoreURLaccessCode, appStorePortNo, appAccessPrivileges, appPreferences, appRestrictions, portNum, access_API_call, linked_wallets_list, and/or the like;

An assets table 1019e includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddres s, assetState, assetZlPcode, assetState, assetCountry, assetEmail, assetlPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 1019f includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentlPaddress, paymentURLaccessCode, paymentPortNo, paymentAccessPrivileges, paymentPreferences, payementRestrictions, and/or the like;

An transactions table 1019g includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 1019h includes fields such as, but not limited to: merchantID, merchantTaxID, merchante- Name, merchantContactUserID, accountID, is suerID, acquirerID, merchantEmail, merchantAddress, merchantState, merchantZIPcode, merchantCountry, merchantAuthKey, merchantIPaddres s, portNum, merchantURLaccessCode, merchantPortNo, merchantAcces sPrivileges, merchantPreferences, merchantRestrictions, and/or the like;

An ads table 1019*i* includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAcces sPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

An ML table 1019*j* includes fields such as, but not limited to: MLID, predictionLogicStructureID, predictionLogicStructureType, predictionLogicStructureConfiguration, predictionLogicStructureTrainedStructure, predictionLogicStructureTrainingData, predictionLogicStructureTrainingDataConfiguration, predictionLogicStructureTestingData, predictionLogicStructureTestingDataConfiguration, predictionLogicStructureOutputData, predictionLogicStructureOutputDataConfiguration, and/or the like;

An RC Templates table 1019*k* includes fields such as, but not limited to: RC_TemplateID, RC_TemplateName, RC_TemplatePeriod, RC_TemplateAgeMin, RC_TemplateAgeMax, RC_TemplateAgeGroupings, RC_TemplateAssetSizeMin, RC_TemplateAssetSizeMax, RC_TemplateAcceptedPortfolioInvestments, RC_TemplateCreationCriteria, RC_TemplateLockupDate, RC_TemplateDecisionDate, RC_TemplateMultipliers, RC_TemplateDistributionFormula, RC_TemplateDistributionTypes, RC_TemplateDistributionDate, RC_TemplateAssetUnlockDate, RC_TemplateSubCirclesRandomization, and/or the like;

An RC Objects table 1019*l* includes fields such as, but not limited to: RC_ObjectID, RC_ObjectAssociatedRC_TemplateID, RC_ObjectAssociatedPoolObjectID, RC_ObjectAssociatedUserIDs, RC_ObjectAssociatedUserAgeGroupIDs, RC_ObjectAssociatedPortfolioIDs, RC_ObjectAssociatedInvestmentIDs, RC_ObjectName, RC_ObjectPeriod, RC_ObjectAgeMin, RC_ObjectAgeMax, RC_ObjectAgeGroupings, RC_ObjectAssetSizeMin, RC_ObjectAssetSizeMax, RC_ObjectAcceptedPortfolioInvestments, RC_ObjectCreationCriteria, RC_ObjectLockupDate, RC_ObjectDecisionDate, RC_ObjectMultipliers, RC_ObjectDistributionFormula, RC_ObjectDistributionTypes, RC_ObjectDistributionDate, RC_ObjectAssetUnlockDate, RC_ObjectSubCirclesRandomization, RC_ObjectCircleYear, RC_ObjectInstantiationDate, RC_ObjectCreationDecisionDate, RC_ObjectActivationDate, RC_ObjectExpirationDate, and/or the like;

A market_data table 1019*z* includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe®, Consolidated Quote System® (CQS), Consolidated Tape Association® (CTA), Consolidated Tape System® (CTS), Dun & Bradstreet®, OTC Montage Data Feed® (OMDF), Reuter's Tib®, Triarch®, US equity trade and quote market data®, Unlisted Trading Privileges® (UTP) Trade Data Feed® (UTDF), UTP Quotation Data Feed® (UQDF), and/or the like feeds, e.g., via ITC 2.1 and/or respective feed protocols), for example, through Microsoft's® Active Template Library and Dealing Object Technology's real-time toolkit Rtt.Multi.

In one embodiment, the TPCD database may interact with other database systems. For example, employing a distributed database system, queries and data access by search TPCD component may treat the combination of the TPCD database, an integrated data security layer database as a single database entity (e.g., see Distributed TPCD below).

In one embodiment, user programs may contain various user interface primitives, which may serve to update the TPCD. Also, various accounts may require custom database tables depending upon the environments and the types of clients the TPCD may need to serve. It should be noted that any unique fields may be designated as a key field throughout. In an alternative embodiment, these tables have been decentralized into their own databases and their respective database controllers (i.e., individual database controllers for each of the above tables). The TPCD may also be configured to distribute the databases over several computer systemizations and/or storage devices Similarly, configurations of the decentralized database controllers may be varied by consolidating and/or distributing the various database components 1019*a-z*. The TPCD may be configured to keep track of various settings, inputs, and parameters via database controllers.

The TPCD database may communicate to and/or with other components in a component collection, including itself, and/or facilities of the like. Most frequently, the TPCD database communicates with the TPCD component, other program components, and/or the like. The database may contain, retain, and provide information regarding other nodes and data.

The TPCDs

The TPCD component 1035 is a stored program component that is executed by a CPU via stored instruction code configured to engage signals across conductive pathways of the CPU and ISICI controller components. In one embodiment, the TPCD component incorporates any and/or all combinations of the aspects of the TPCD that were discussed in the previous figures. As such, the TPCD affects accessing, obtaining and the provision of information, services, transactions, and/or the like across various communications networks. The features and embodiments of the TPCD discussed herein increase network efficiency by reducing data transfer requirements with the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the TPCD's features and facilities, and in many cases reduce the costs, energy consumption/requirements, and extend the life of TPCD's underlying infrastructure; this has the added benefit of making the TPCD more reliable Similarly, many of the features and mechanisms are designed to be easier for users to use and access, thereby broadening the audience that may enjoy/employ and exploit the feature sets of the TPCD; such ease of use also helps to increase the reliability of the TPCD. In addition, the feature sets include heightened security as noted via the Cryptographic components 1020, 1026, 1028 and throughout, making access to the features and data more reliable and secure The TPCD transforms TOP-RC search request, TOP-RC selection request inputs, via TPCD components (e.g., CTM, COC, CPD), into TOP-RC search response, TOP-RC selection response, pool distribution notification request outputs.

The TPCD component facilitates access of information between nodes may be developed by employing various development tools and languages such as, but not limited to: Apache® components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, Ruby, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the TPCD server employs a cryptographic server to encrypt and decrypt communications. The TPCD component may communicate to and/or with other components in a component collection, including itself, and/or facilities of the like. Most frequently, the TPCD component communicates with the TPCD database, operating systems, other program components, and/or the like. The TPCD may contain, communicate, generate, obtain, and/or provide program component, system, user, and/or data communications, requests, and/or responses.

Distributed TPCDs

The structure and/or operation of any of the TPCD node controller components may be combined, consolidated, and/or distributed in any number of ways to facilitate development and/or deployment Similarly, the component collection may be combined in any number of ways to facilitate deployment and/or development. To accomplish this, one may integrate the components into a common code base or in a facility that can dynamically load the components on demand in an integrated fashion. As such, a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access, etc.).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so as discussed through the disclosure and/or through various other data processing communication techniques.

The configuration of the TPCD controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for TPCD controller and/or TPCD component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), NeXT Computer, Inc.'s (Dynamic) Object Linking, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as JSON, lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c —post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the TPCD controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die( 'Could not bind to address' );
socket_listen($sock);
$client = socket_accept($sock);
// read input data from client device in 1024 byte blocks until end
of message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for Thematic Protocol and Circle Datastructure Apparatuses, Processes and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivatives thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such.

Terms such as "attached", "affixed", "connected", "coupled", "interconnected", etc. may refer to a relationship where structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, provisionals, re-issues, and/ or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a TPCD individual and/or enterprise user, database configuration and/or relational model, data type, data transmission and/or network framework, library, syntax structure, and/or the like, various embodiments of the TPCD, may be implemented that allow a great deal of flexibility and customization. For example, aspects of the TPCD may be adapted for asset management, inventory management, risk management, etc. While various embodiments and discussions of the TPCD have included information technology, however, it is to be understood that the embodiments described herein may be readily configured and/or customized for a wide variety of other applications and/or implementations.

What is claimed is:

1. A thematic protocol and circle data structure generator apparatus, comprising:

at least one memory;

a component collection stored in the at least one memory;

any of at least one processor disposed in communication with the at least one memory, the any of at least one processor executing processor-executable instructions from the component collection, storage of the component collection structured with processor-executable instructions, comprising:

obtain a thematic circle join request datastructure, in which the thematic circle join request datastructure is structured including a user object identifier, a portfolio object identifier associated with the user object identifier, and a thematic circle template identifier;

determine a thematic circle object instantiated based on a thematic circle template corresponding to the thematic circle template identifier;

add the user object identifier to a participants datastructure comprising participant user object identifiers associated with the thematic circle object;

mark a portfolio object corresponding to the portfolio object identifier as locked;

evaluate a set of creation criteria associated with the thematic circle object based on analysis of user objects corresponding to user object identifiers in the participants datastructure, in which the set of creation criteria is defined in the thematic circle template;

activate the thematic circle object based on a determination that the set of creation criteria has been met, in which the instructions activating the thematic circle object are structured including instructions starting a circle period timer on an activation date associated with the thematic circle object; and initiate a pool distribution protocol associated with the thematic circle object upon expiration of the circle period timer, in which the pool distribution protocol is defined in the thematic circle template.

2. The apparatus of claim 1, in which the thematic circle join request datastructure is structured including a set of thematic circle characteristics, and in which the thematic circle object is determined also based on the set of thematic circle characteristics.

3. The apparatus of claim 2, in which the set of thematic circle characteristics is obtained via a user interface structured obtaining input from a user.

4. The apparatus of claim 1, in which the component collection storage is further structured with processor-executable instructions, comprising:

determine that a thematic circle object based on the thematic circle template corresponding to the thematic circle template identifier has not been previously instantiated; and instantiate the thematic circle object, in which the instructions instantiating the thematic circle object are structured including instructions setting a creation decision date for the thematic circle object, and in which the instructions evaluating the set of creation criteria are structured including instructions performing the evaluation after reaching the creation decision date.

5. The apparatus of claim 1, in which the component collection storage is further structured with processor-executable instructions, comprising:

determine a set of user groups associated with the thematic circle object;

determine a set of user grouping characteristics associated with a user object corresponding to the user object identifier;

determine a matching user group, from the set of user groups, based on evaluation of the set of user grouping characteristics; and in which the instructions adding the user object identifier to the participants datastructure are structured including instructions associating the user object identifier with the matching user group.

6. The apparatus of claim 5, in which the set of user groups is a set of age groups.

7. The apparatus of claim 1, in which the thematic circle join request datastructure is structured including a set of investment object identifiers associated with the portfolio object identifier; and in which the instructions marking the portfolio object corresponding to the portfolio object identifier as locked are structured including instructions marking investment objects corresponding to the set of investment object identifiers as locked.

8. The apparatus of claim 1, in which assets associated with the portfolio object marked as locked can be traded but cannot be withdrawn by a user corresponding to the user object identifier.

9. The apparatus of claim 1, in which the set of creation criteria includes specifications for a set of metrics that include at least one of: number of applicants, applicant asset ratio deviation, applicant portfolio return ratio deviation.

10. The apparatus of claim 1, in which the instructions initiating the pool distribution protocol associated with the thematic circle object are structured as instructions generating a pool distribution request function call.

11. The apparatus of claim 10, in which the component collection storage is further structured with processor-executable instructions, comprising:

obtain the pool distribution request function call associated with the thematic circle object;

determine a user mortality status for each user object identifier in the participants datastructure;

transfer for each user object identifier with non-surviving user mortality status, a portfolio object associated with the respective user object identifier to a pool object associated with the thematic circle object;

mark the portfolio object corresponding to the portfolio object identifier as unlocked;

calculate a pool distribution value for a user object corresponding to the user object identifier, in which the user object identifier has surviving user mortality status;

determine a pool distribution allocation for the user object; and generate a pool distribution notification that includes a set of allocation actions that facilitate transferring the pool distribution allocation to the portfolio object corresponding to the portfolio object identifier.

12. The apparatus of claim 11, in which the instructions determining a user mortality status for a user object identifier are structured as instructions querying a mortality status oracle server.

13. The apparatus of claim 11, in which the instructions determining a user mortality status for a user object identifier are structured as instructions evaluating a smart contract stored on a blockchain.

14. The apparatus of claim 11, in which the instructions calculating the pool distribution value for the user object corresponding to the user object identifier are structured including instructions determining a thematic circle share multiplier associated with the user object.

15. The apparatus of claim 11, in which the instructions determining the pool distribution allocation for the user object are structured including instructions determining a pool distribution type for the user object.

16. A thematic protocol and circle data structure generator processor-readable, non-transient medium, the medium storing a component collection, storage of the component collection structured with processor-executable instructions comprising:

obtain a thematic circle join request datastructure, in which the thematic circle join request datastructure is structured including a user object identifier, a portfolio object identifier associated with the user object identifier, and a thematic circle template identifier;

determine a thematic circle object instantiated based on a thematic circle template corresponding to the thematic circle template identifier;

add the user object identifier to a participants datastructure comprising participant user object identifiers associated with the thematic circle object;

mark a portfolio object corresponding to the portfolio object identifier as locked;

evaluate a set of creation criteria associated with the thematic circle object based on analysis of user objects corresponding to user object identifiers in the participants datastructure, in which the set of creation criteria is defined in the thematic circle template;

activate the thematic circle object based on a determination that the set of creation criteria has been met, in which the instructions activating the thematic circle object are structured including instructions starting a circle period timer on an activation date associated with the thematic circle object; and initiate a pool distribution protocol associated with the thematic circle object upon expiration of the circle period timer, in which the pool distribution protocol is defined in the thematic circle template.

17. A thematic protocol and circle data structure generator processor-implemented system, comprising:

means to store a component collection;

means to process processor-executable instructions from the component collection, storage of the component collection structured with processor-executable instructions comprising:

obtain a thematic circle join request datastructure, in which the thematic circle join request datastructure is structured including a user object identifier, a portfolio object identifier associated with the user object identifier, and a thematic circle template identifier;

determine a thematic circle object instantiated based on a thematic circle template corresponding to the thematic circle template identifier;

add the user object identifier to a participants datastructure comprising participant user object identifiers associated with the thematic circle object;

mark a portfolio object corresponding to the portfolio object identifier as locked;

evaluate a set of creation criteria associated with the thematic circle object based on analysis of user objects corresponding to user object identifiers in the participants datastructure, in which the set of creation criteria is defined in the thematic circle template;

activate the thematic circle object based on a determination that the set of creation criteria has been met, in which the instructions activating the thematic circle object are structured including instructions starting a circle period timer on an activation date associated with the thematic circle object; and initiate a pool distribution protocol associated with the thematic circle object upon expiration of the circle period timer, in which the pool distribution protocol is defined in the thematic circle template.

18. A thematic protocol and circle data structure generator processor-implemented process, including processing processor-executable instructions via any of at least one processor from a component collection stored in at least one memory, storage of the component collection structured with processor-executable instructions comprising:

obtain a thematic circle join request datastructure, in which the thematic circle join request datastructure is structured including a user object identifier, a portfolio object identifier associated with the user object identifier, and a thematic circle template identifier;

determine a thematic circle object instantiated based on a thematic circle template corresponding to the thematic circle template identifier;

add the user object identifier to a participants datastructure comprising participant user object identifiers associated with the thematic circle object;

mark a portfolio object corresponding to the portfolio object identifier as locked;

evaluate a set of creation criteria associated with the thematic circle object based on analysis of user objects corresponding to user object identifiers in the participants datastructure, in which the set of creation criteria is defined in the thematic circle template;

activate the thematic circle object based on a determination that the set of creation criteria has been met, in which the instructions activating the thematic circle object are structured including instructions starting a circle period timer on an activation date associated with the thematic circle object; and initiate a pool distribution protocol associated with the thematic circle object upon expiration of the circle period timer, in which the pool distribution protocol is defined in the thematic circle template.

\* \* \* \* \*